(12) United States Patent
Chande et al.

(10) Patent No.: US 12,058,736 B2
(45) Date of Patent: Aug. 6, 2024

(54) SENSING BANDWIDTH ADJUSTED ENERGY DETECTION THRESHOLDS

(71) Applicant: QUALCOMM Incorporated, San Diego, CA (US)

(72) Inventors: Vinay Chande, San Diego, CA (US); Arumugam Chendamarai Kannan, San Diego, CA (US); Srinivas Yerramalli, San Diego, CA (US); Giovanni Chisci, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 17/395,415

(22) Filed: Aug. 5, 2021

(65) Prior Publication Data
US 2022/0053563 A1    Feb. 17, 2022

Related U.S. Application Data

(60) Provisional application No. 63/064,375, filed on Aug. 11, 2020, provisional application No. 63/064,352, filed on Aug. 11, 2020.

(51) Int. Cl.
*H04W 74/08*    (2024.01)
*H04B 17/336*    (2015.01)
(Continued)

(52) U.S. Cl.
CPC ...... *H04W 74/0816* (2013.01); *H04B 17/336* (2015.01); *H04W 24/10* (2013.01)

(58) Field of Classification Search
None
See application file for complete search history.

(56) References Cited

U.S. PATENT DOCUMENTS

2018/0234886 A1*  8/2018  Bhorkar .............. H04W 28/18
2018/0242364 A1*  8/2018  Park .................... H04W 24/08
(Continued)

OTHER PUBLICATIONS

Futurewei: "Channelization in Unlicensed Spectrum above 52 .6GHz and below 71GHZ", 3GPP TSG RAN WG1 Meeting #101-e, 3GPP Draft, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 15, 2020 (May 15, 2020), 5 Pages, XP051885081, Retrieved from the Internet: URL: https://www.3gpp.org/ftp/tsg_ran/WG1_RL1/TSGR1_101-e/Docs/R1-2003286.zip, R1-2003286.docx, [retrieved on May 15, 2020], Paragraph [0004].

(Continued)

*Primary Examiner* — Scott M Sciacca
(74) *Attorney, Agent, or Firm* — QUALCOMM Incorporated

(57) ABSTRACT

The present disclosure relates to methods and devices for wireless communication including an apparatus, e.g., a UE and/or a base station. In one aspect, the apparatus may determine an energy detection threshold of a reference bandwidth, the energy detection threshold being based on at least one of a transmit power or a power class. The apparatus may also measure an interference level of at least one signal. Additionally, the apparatus may adjust the energy detection threshold of the reference bandwidth based on a sensing bandwidth. The apparatus may also determine whether a transmission medium is available based on at least one of the adjusted energy detection threshold or the measured interference level of the at least one signal.

28 Claims, 19 Drawing Sheets

(51) Int. Cl.
*H04W 24/10* (2009.01)
*H04W 74/0816* (2024.01)

(56) References Cited

U.S. PATENT DOCUMENTS

| | | | |
|---|---|---|---|
| 2019/0059104 A1* | 2/2019 | Gu .................... | H04W 74/0808 |
| 2019/0230706 A1 | 7/2019 | Li et al. | |
| 2019/0239252 A1 | 8/2019 | Babaei et al. | |
| 2020/0229219 A1 | 7/2020 | Xue et al. | |
| 2023/0049707 A1* | 2/2023 | Harada ............. | H04W 74/0816 |
| 2023/0189020 A1* | 6/2023 | Calcev ............. | H04W 74/0816 |
| | | | 370/329 |
| 2023/0319874 A1* | 10/2023 | Myung ............. | H04W 72/0457 |
| | | | 370/329 |

OTHER PUBLICATIONS

International Search Report and Written Opinion—PCT/US2021/045108—ISA/EPO—Nov. 30, 2021.

\* cited by examiner

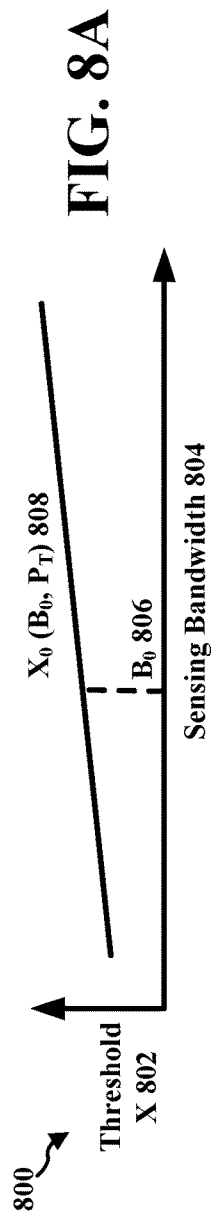
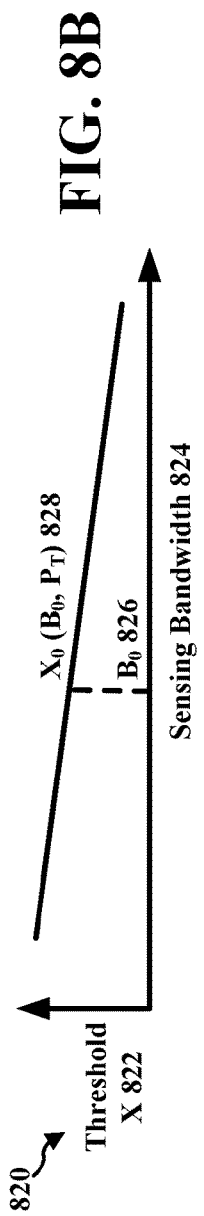
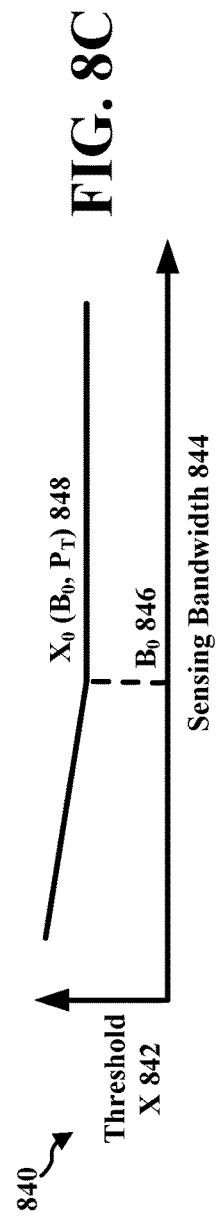
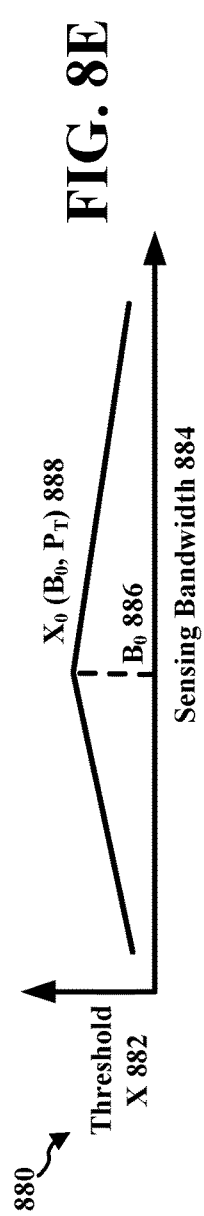

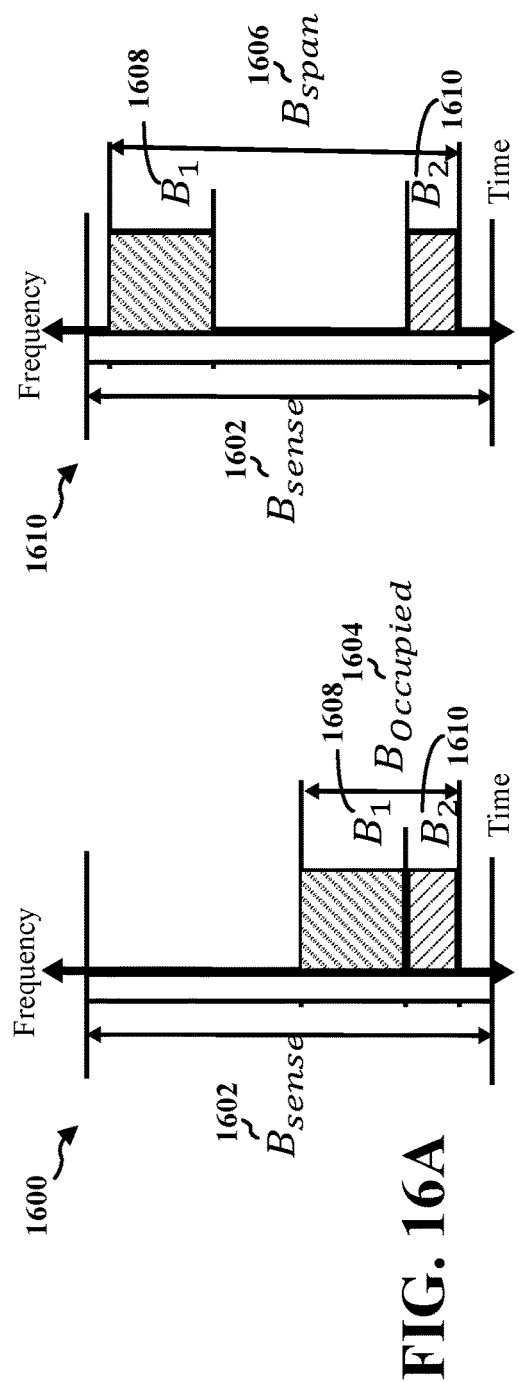
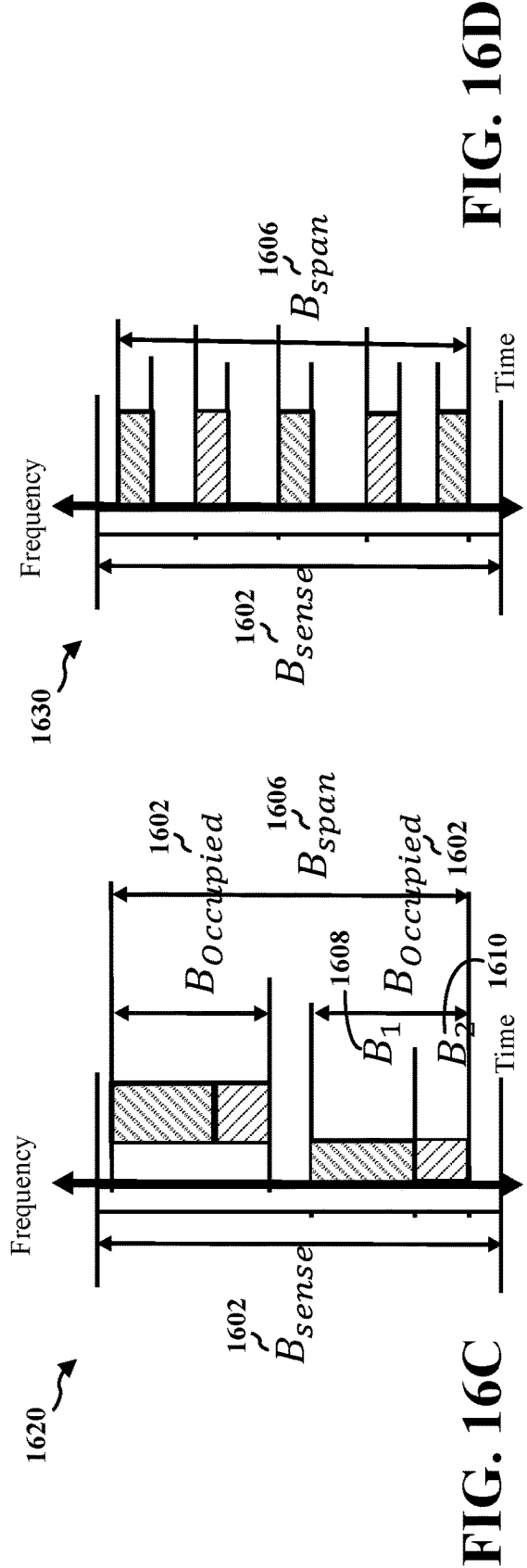
FIG. 16A
FIG. 16B
FIG. 16C
FIG. 16D

SENSING BANDWIDTH ADJUSTED ENERGY DETECTION THRESHOLDS

CROSS REFERENCE TO RELATED APPLICATION(S)

This application claims the benefit of U.S. Provisional Application Ser. No. 63/064,375, entitled "METHODS AND APPARATUS FOR SENSING BANDWIDTH ADJUSTED ENERGY DETECTION THRESHOLDS" and filed on Aug. 11, 2020, and U.S. Provisional Application Ser. No. 63/064,352, entitled "THRESHOLD ADAPTION FOR MISMATCH BETWEEN SENSING AND TRANSMISSION BANDWIDTHS" and filed on Aug. 11, 2020, each of which is expressly incorporated by reference herein in its entirety.

TECHNICAL FIELD

The present disclosure relates generally to communication systems, and more particularly, to beam transmissions in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc) mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may determine an energy detection threshold of a reference bandwidth, the energy detection threshold being based on at least one of a transmit power or a power class. The apparatus may also measure an interference level of at least one signal. The apparatus may also adjust the energy detection threshold of the reference bandwidth based on a sensing bandwidth. Additionally, the apparatus may compare the adjusted energy detection threshold to the measured interference level of the at least one signal. The apparatus may also determine whether a transmission medium is available based on at least one of the adjusted energy detection threshold or the measured interference level of the at least one signal. Moreover, the apparatus may transmit data via the transmission medium when the measured interference level of the at least one signal is less than the adjusted energy detection threshold. The apparatus may also refrain from transmitting data via the transmission medium when the measured interference level of the at least one signal is greater than or equal to the adjusted energy detection threshold.

In another aspect of the disclosure, a method, a computer-readable medium, and an apparatus are provided. The apparatus may be a base station. The apparatus may determine an energy detection threshold of a reference bandwidth, the energy detection threshold being based on at least one of a transmit power or a power class. The apparatus may also measure an interference level of at least one signal. The apparatus may also adjust the energy detection threshold of the reference bandwidth based on a sensing bandwidth. Additionally, the apparatus may compare the adjusted energy detection threshold to the measured interference level of the at least one signal. The apparatus may also determine whether a transmission medium is available based on at least one of the adjusted energy detection threshold or the measured interference level of the at least one signal. Moreover, the apparatus may transmit data via the transmission medium when the measured interference level of the at least one signal is less than the adjusted energy detection threshold. The apparatus may also refrain from transmitting data via the transmission medium when the measured interference level of the at least one signal is greater than or equal to the adjusted energy detection threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A-8E are graphs illustrating a reference threshold compared to a sensing bandwidth in accordance with one or more techniques of the present disclosure.

FIGS. 16A-16D illustrate examples of adjusted sensing thresholds.

DETAILED DESCRIPTION

Figure 1:
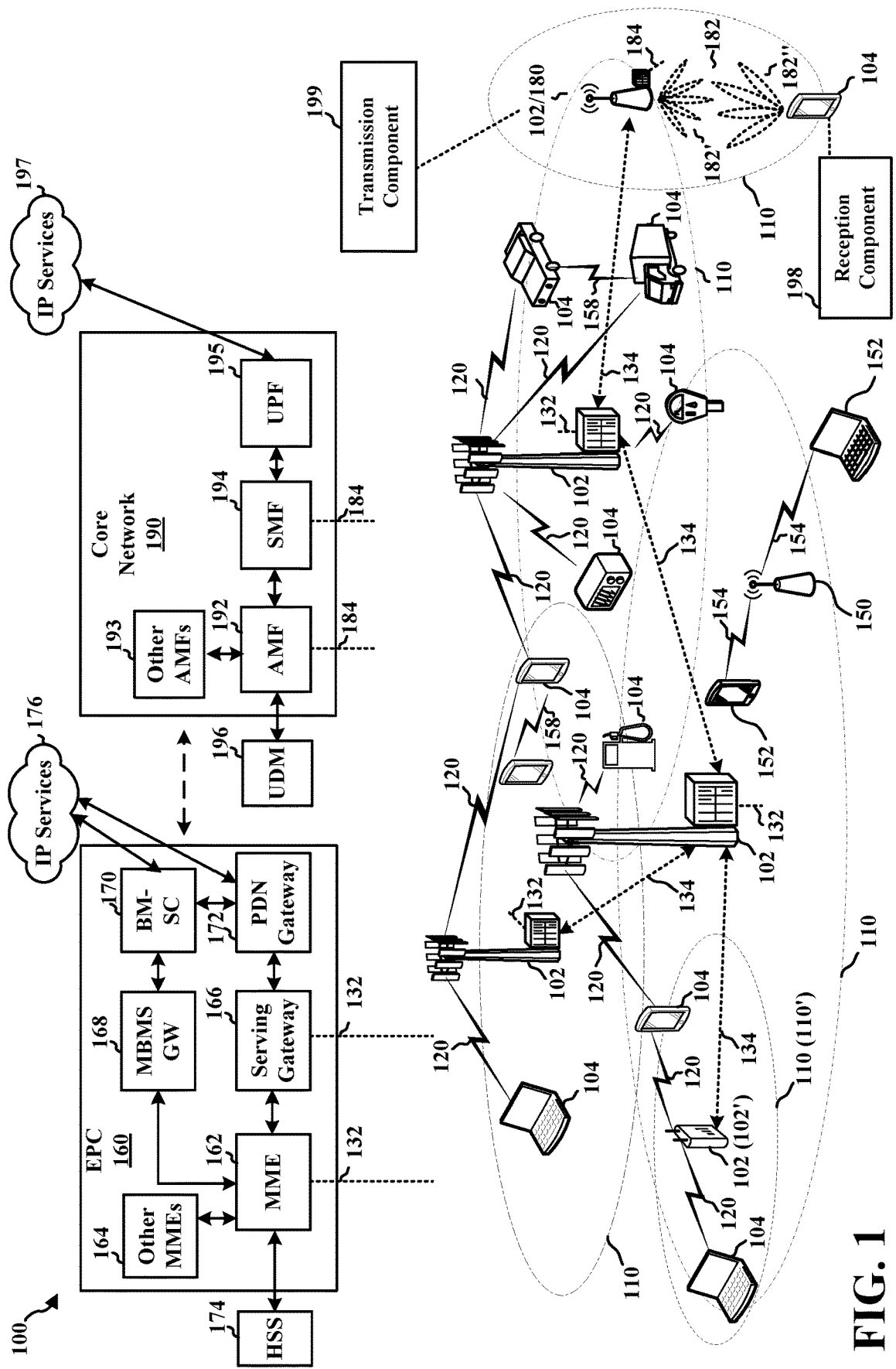
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to determine an energy detection threshold of a reference bandwidth, the energy detection threshold being based on at least one of a transmit power or a power class. Reception component 198 may also be configured to measure an interference level of at least one signal. Reception component 198 may also be configured to adjust the energy detection threshold of the reference bandwidth based on a sensing bandwidth. Reception component 198 may also be configured to compare the adjusted energy detection threshold to the measured interference level of the at least one signal. Reception component 198 may also be configured to determine whether a transmission medium is available based on at least one of the adjusted energy detection threshold or the measured interference level of the at least one signal. Reception component 198 may also be configured to transmit data via the transmission medium when the measured interference level of the at least one signal is less than the adjusted energy detection threshold. Reception component 198 may also be configured to refrain from transmitting data via the transmission medium when the measured interference level of the at least one signal is greater than or equal to the adjusted energy detection threshold.

Referring again to FIG. 1, in certain aspects, the base station 180 may include a transmission component 199 configured to determine an energy detection threshold of a reference bandwidth, the energy detection threshold being based on at least one of a transmit power or a power class. Transmission component 199 may also be configured to measure an interference level of at least one signal. Transmission component 199 may also be configured to adjust the energy detection threshold of the reference bandwidth based on a sensing bandwidth. Transmission component 199 may also be configured to compare the adjusted energy detection threshold to the measured interference level of the at least one signal. Transmission component 199 may also be configured to determine whether a transmission medium is available based on at least one of the adjusted energy detection threshold or the measured interference level of the at least one signal. Transmission component 199 may also be configured to transmit data via the transmission medium when the measured interference level of the at least one signal is less than the adjusted energy detection threshold. Transmission component 199 may also be configured to refrain from transmitting data via the transmission medium when the measured interference level of the at least one signal is greater than or equal to the adjusted energy detection threshold.

Although the following description may be focused on 5G NR, the concepts described herein may be applicable to other similar areas, such as LTE, LTE-A, CDMA, GSM, and other wireless technologies.

Figure 2:
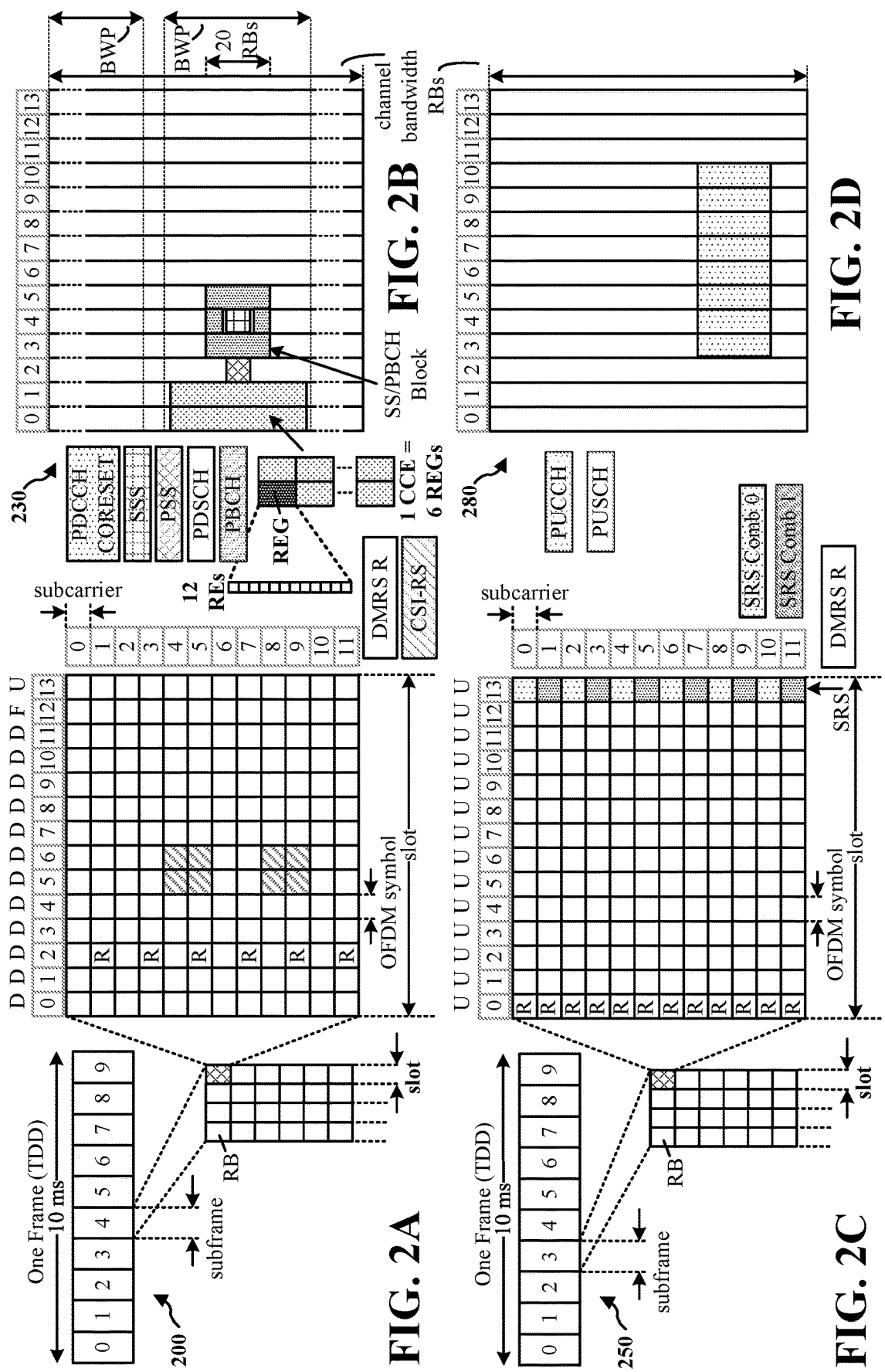
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
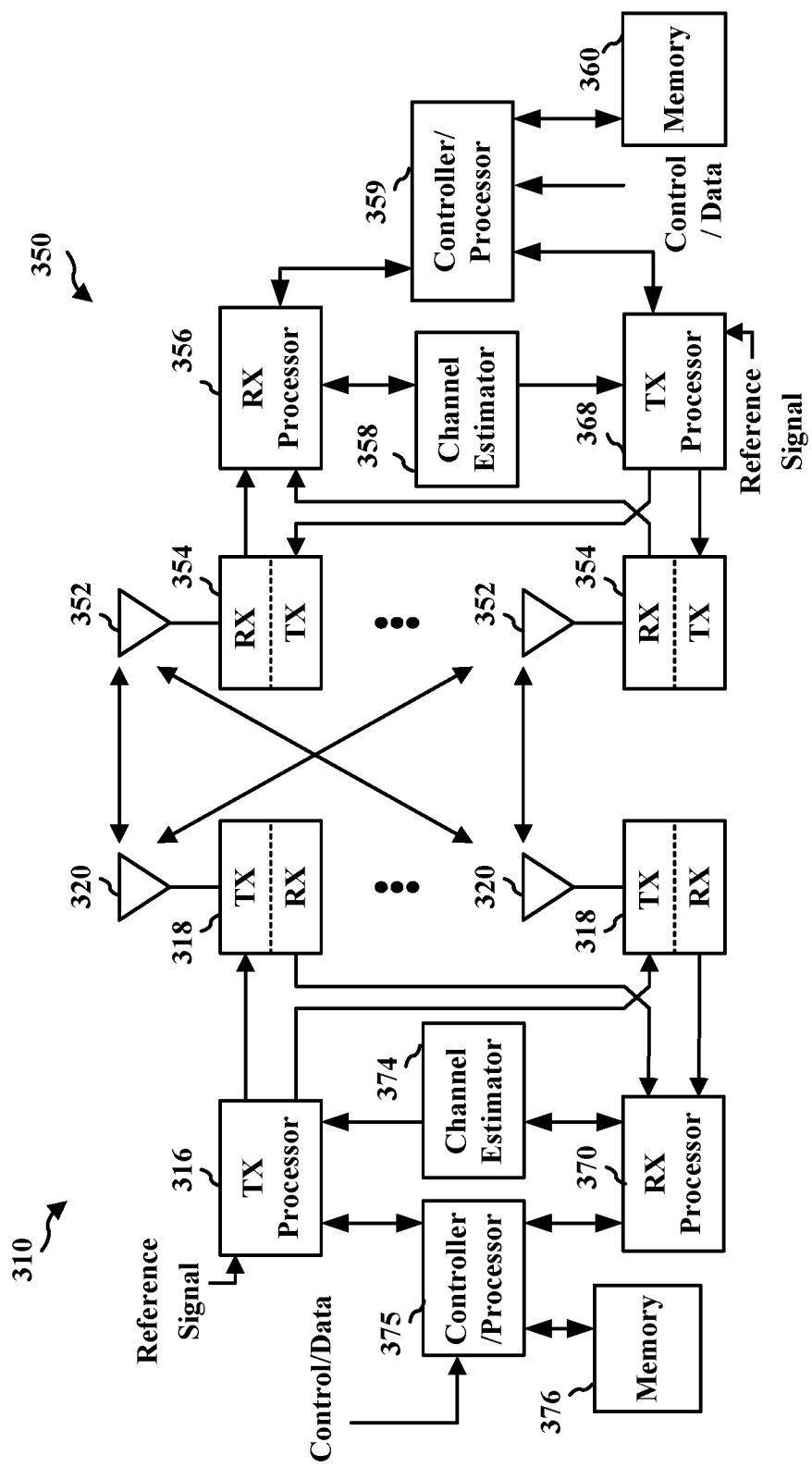
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communications include node operating channel heterogeneity, such as heterogeneous radio frequency (RF) bandwidths in an unlicensed spectrum. For instance, an unlicensed spectrum, e.g., around 60 GHz, may permit a deployment of nodes with a wide variety of bandwidths. Aggressor nodes with bandwidth heterogeneity may cause a frequency selective interference. Further, victim nodes with bandwidth heterogeneity may suffer a frequency selective interference. Wireless communications may also include serving cell bandwidth heterogeneity. For instance, in new radio (NR) wireless communications, a base station and served UEs may use different bandwidths or bandwidth parts (BWPs) for operation on a single network operating channel. In some instances, there may be no common channelization. Also, non-NR victims and aggressors may use wider bands, e.g., 2.16 GHz.

Aspects of wireless communications may include bandwidth and sensing thresholds. For example, European telecommunications standards institute (ETSI) models for adaptivity may be around 60 GHz. An energy threshold $X_T(P_{out})$ may be a function of maximum equivalent isotropic radiated power (EIRP) $P_{out}$, e.g., for $P_{out}$ in dBm. Also, the following formula may be utilized for the threshold: $X_T(P_{out}) = -47$ dBm+(40 dBm−$P_{out}$). This may also be independent of a bandwidth of the operating channel. Further, ETSI adaptivity for load-based equipment may be another frequency, e.g., at 5 GHz, assuming a transmission bandwidth B and EIRP $P_{out}$ in dBm. The following formula may also be utilized for the threshold: $X_T(P_{out}) = -73$ dBm+10*log 10(B)+(23 dBm−$P_{out}$). The threshold may also increase with a bandwidth contended for fixed EIRP $P_{out}$.

In NR-unlicensed (NR-U) in certain frequencies, e.g., 5 GHz, an NR-unlicensed sensing may be assumed to be performed in a channel of 20 MHz bandwidth in listen before talk (LBT) communication. This may occur at an energy detection (ED) threshold for transmitting at maximum power (max P). In some instances, there may be a fixed high threshold per 20 MHz in the absence of other technologies, e.g., −52 dBm. Otherwise, the threshold may be determined as a function of channel bandwidth, e.g., an LBT bandwidth of 20 MHz, and an output power relationship.

Aspects of wireless communication may also include a contention slot busy determination by sensing. In LBT communications, a carrier sense unit at a contending node in an unlicensed band operation may determine whether a contention slot, e.g., 9 μs for sub-6 GHz or 5 μs for 60 GHz, is busy for a node. For instance, the carrier sense unit may determine if a sensed interference level quality metric, e.g., energy received, is a greater than a threshold. The energy may be measured over the bandwidth of an operating channel for sensing. The threshold may be a function of a power class, maximum transmit power, and/or EIRP.

Figure 4:
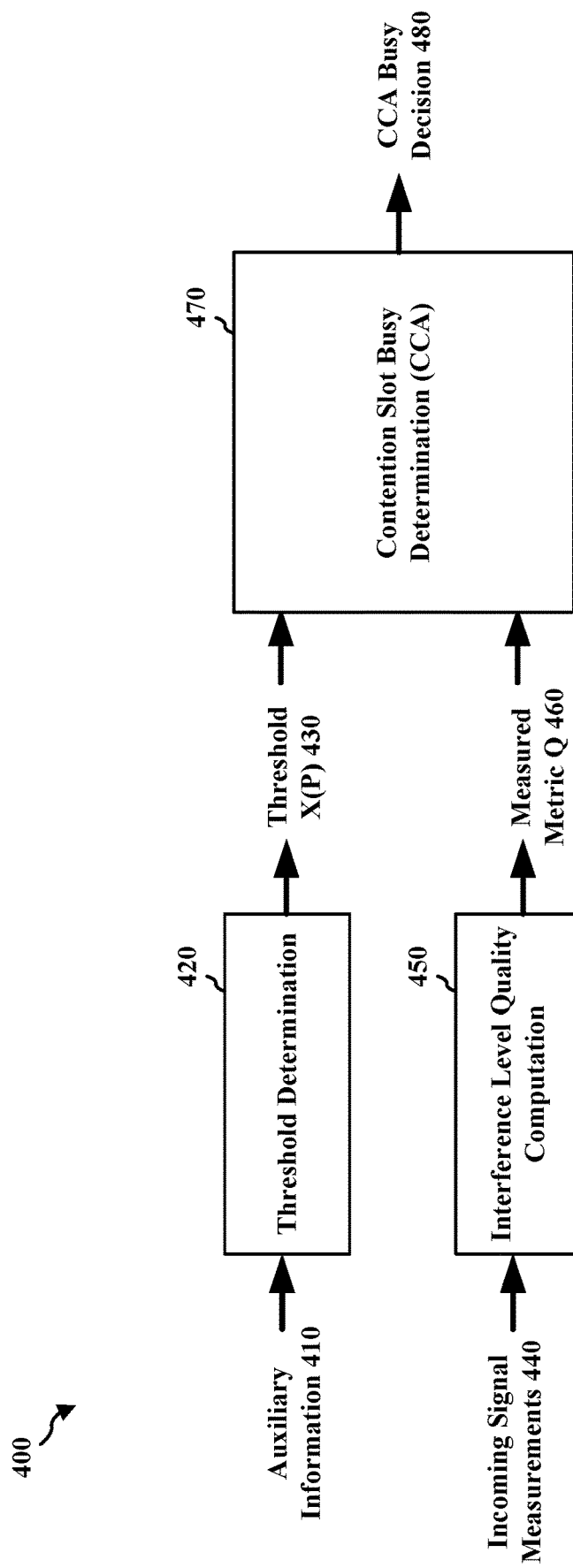
FIG. 4 is a diagram illustrating an example contention determination process in accordance with one or more techniques of the present disclosure.

FIG. 4 is a diagram 400 illustrating an example contention determination process. As shown in FIG. 4, diagram 400 includes auxiliary information 410, a threshold determination 420, a threshold 430, incoming signal measurements 440, an interference level quality computation 450, and a measured metric Q 460. Diagram 400 also includes a contention slot busy determination or clear channel assessment (CCA) 470 and a CCA busy decision 480.

As shown in FIG. 4, auxiliary information 410, e.g., bandwidth, power class, and/or transmit power, may be an input for a threshold determination 420. The threshold determination 420 may produce a threshold 430, i.e., X(P) 430. Also, an incoming signal measurement 440 may be an input to an interference level quality computation 450, e.g., an energy measurement, which may produce a measured metric Q 460, e.g., energy. The threshold X(P) 430 and the measured metric Q 460 may be utilized in a contention slot busy decision 470, e.g., a clear channel assessment (CCA) 470. This contention slot busy decision or CCA 470 may result in CCA busy decision 480. For example, CCA busy decision 480 may be a true or false answer depending on whether measured metric Q 460 is greater than or equal to threshold X(P) 430.

Additionally, there may be a schematic relationship between a heterogeneous operating channel, a sensing bandwidth, and a transmission bandwidth. A sensing bandwidth may be a bandwidth over which energy is measured to make a determination about channel access in an unlicensed or shared spectrum. For example, the smallest sensing bandwidth for Wi-Fi may be 20 MHz. For NR-U, the sensing bandwidth at a UE and a base station may be a multiple of an LBT bandwidth, e.g., 20 MHz.

Figure 5:
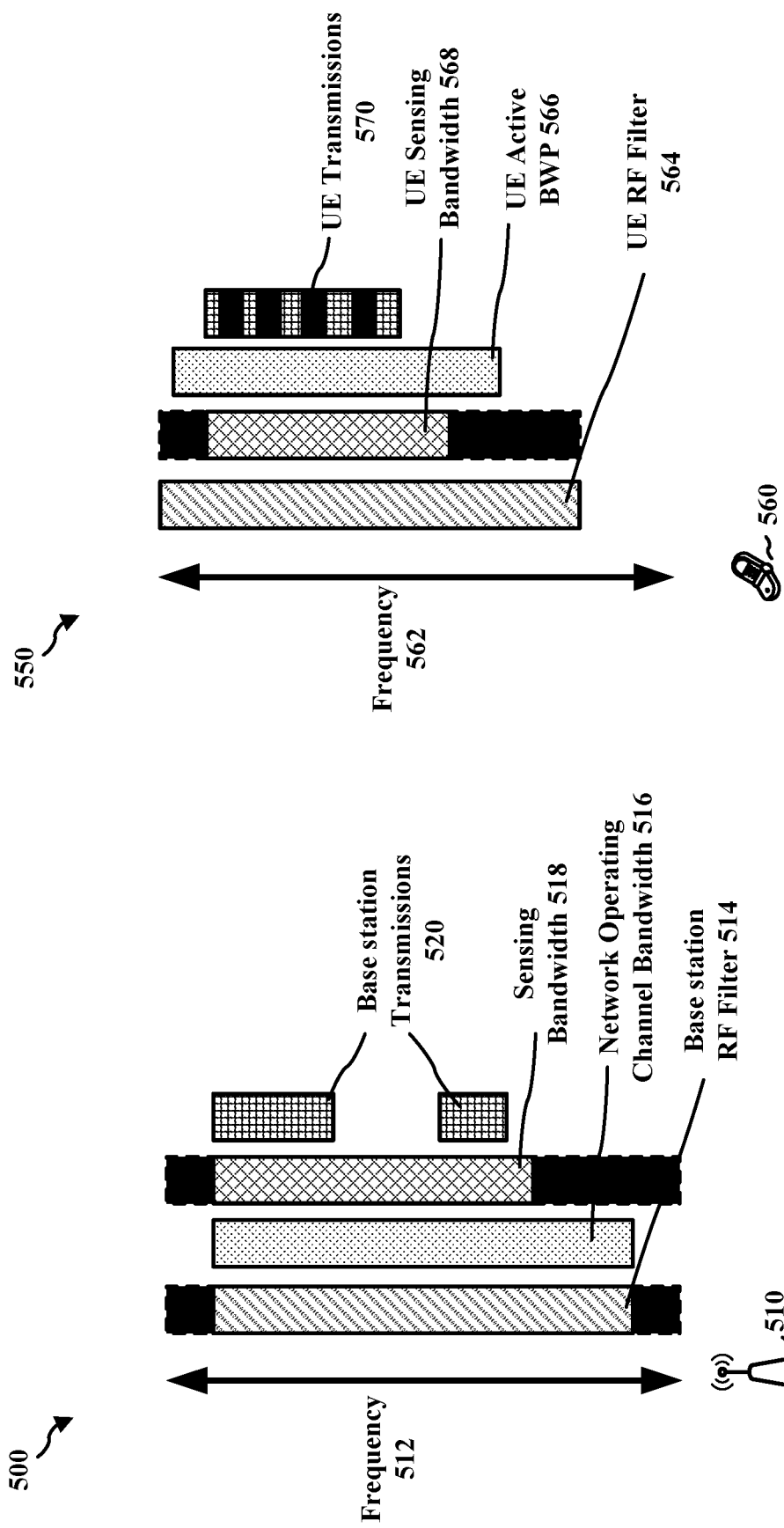
FIG. 5A is a diagram illustrating example transmissions of a base station in accordance with one or more techniques of the present disclosure.
FIG. 5B is a diagram illustrating example transmissions of a UE in accordance with one or more techniques of the present disclosure.

FIG. 5A is a diagram 500 illustrating transmissions of a base station 510. FIG. 5A displays a number of transmission bandwidths and communications at base station 510. As shown in FIG. 5A, diagram 500 includes base station 510, frequency 512, base station radio frequency (RF) filter 514, network operating channel bandwidth 516, sensing bandwidth 518, and base station transmissions 520. FIG. 5A shows that the base station transmissions 520 may be within the sensing bandwidth 518.

FIG. 5B is a diagram 550 illustrating transmissions of a UE 560. FIG. 5B displays a number of transmission bandwidths and communications at UE 560. As shown in FIG. 5B, diagram 550 includes a frequency 562, a UE RF filter 564, a UE active BWP 566, UE sensing bandwidth 568, and UE transmissions 570. FIG. 5B shows that the UE transmissions 570 may be within the UE sensing bandwidth 568.

As indicated herein, some aspects of wireless communications may not include the ability to adjust a threshold for a sensing bandwidth. As such, these transmissions may not be flexible or may not have the ability to adjust to different thresholds. Based on the above, it may be beneficial to provide a threshold adjustment with a sensing bandwidth. It may also be beneficial to provide an energy sensing framework for LBT communication for a contention slot when utilizing bandwidth heterogeneity.

Aspects of the present disclosure may include a threshold adjustment based on a sensing bandwidth. For instance, aspects of the present disclosure may include an energy sensing framework for LBT communication for a contention slot when utilizing bandwidth heterogeneity. Aspects of the present disclosure may also include a relationship between transmit power or EIRP and a measured energy via an adjustment to an energy detection threshold as a function of bandwidths. Aspects of the present disclosure may utilize this comparison for a contention determination process.

Aspects of the present disclosure may define a reference bandwidth, $B_0$, or a reference threshold, $X_0(B_0, P_T)$, expressed in dBm. As indicated above, the sensing bandwidth may be larger than an operating bandwidth or a transmission bandwidth. The reference bandwidth may be used as a reference to determine whether a transmission medium is available for transmission. In some aspects, the reference bandwidth may be a part of a quantized set of reference bandwidths that are used to compute an energy threshold. Also, $P_T$ may represent a static or semi-static version of transmit power. For example, $P_T$ may represent a maximum EIRP permitted for a device class or a transmit power class.

Figure 6:
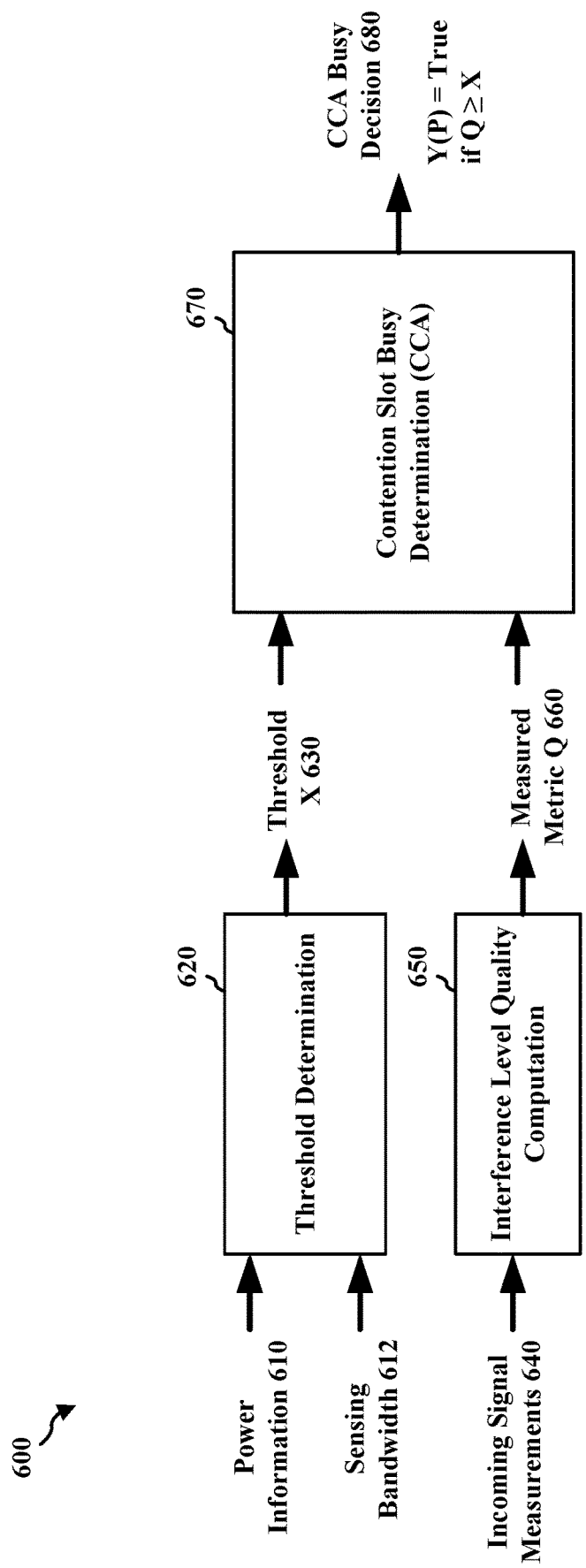
FIG. 6 is a diagram illustrating an example contention determination process in accordance with one or more techniques of the present disclosure.

FIG. 6 is a diagram 600 illustrating an example contention determination process. As shown in FIG. 6, diagram 600 may include power information 610, sensing bandwidth 612, a threshold determination 620, a threshold X 630, incoming signal measurements 640, an interference level quality computation 650, and a measured metric Q 660. Diagram 600 also includes a contention slot busy determination or clear channel assessment (CCA) 670, and a CCA busy decision 680.

As shown in FIG. 6, power information 610, e.g., a power class and/or maximum transmit power, and sensing bandwidth 612 may be an input for threshold determination 620, which may produce threshold X 630. Also, incoming signal measurements 640 may be an input to interference level quality computation 650, e.g., an energy measurement, which may produce a measured metric Q 660, e.g., energy. The threshold X 630 and the measured metric Q 660 may be utilized in contention slot busy determination 670, e.g., a clear channel assessment (CCA) 670. Further, the contention slot busy determination or CCA 670 may result in CCA busy decision 680. The CCA busy decision 680 may be a true or false answer depending on whether measured metric Q 660 is greater than or equal to threshold X 630.

Aspects of the present disclosure may include a threshold that is adjusted for a sensing bandwidth. For example, $X_{Thresh}=X_0(B_0, P_T)+f(B_S, B_0)$, where $X_{Thresh}$ is an adjusted energy threshold, $B_0$ is the reference bandwidth, $P_T$ is the transmit power, $X_0$ is the reference threshold, $B_S$ is the sensing bandwidth, and $f(B_S, B_0)$ is the threshold adjustment. Aspects of the present disclosure may include a number of options for the threshold adjustment.

Figure 7:
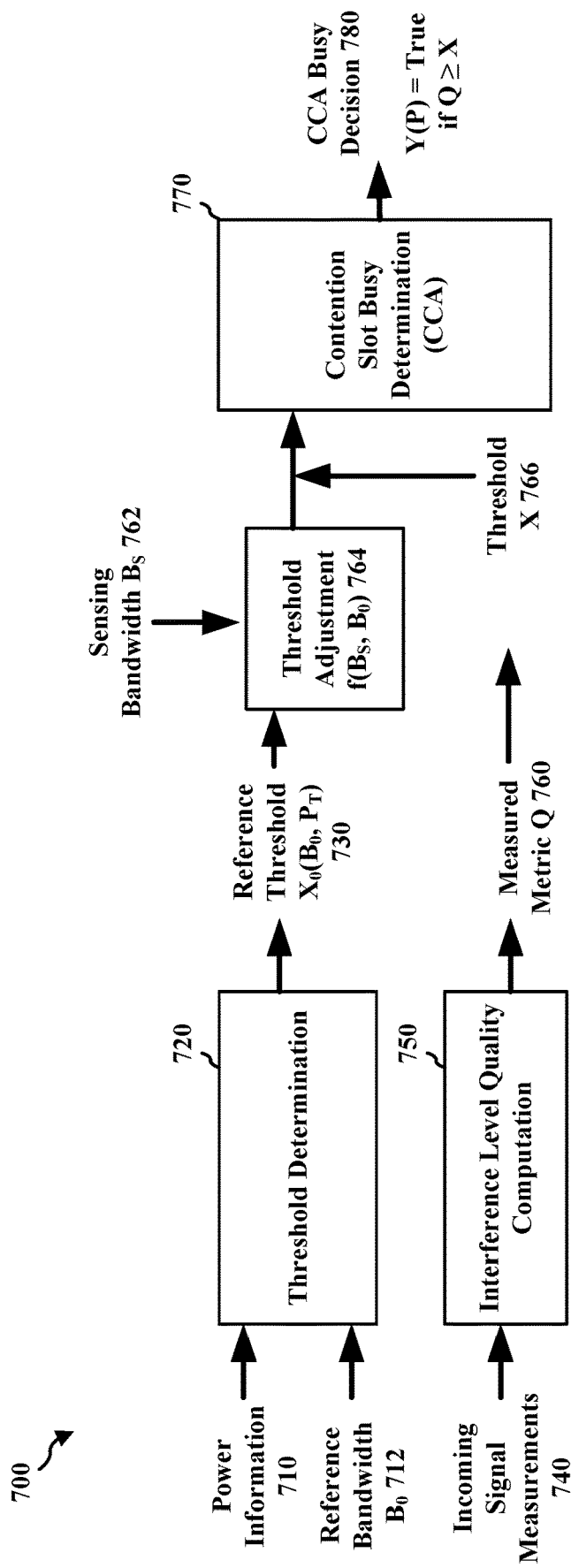
FIG. 7 is a diagram illustrating an example contention determination process in accordance with one or more techniques of the present disclosure.

FIG. 7 is a diagram 700 illustrating an example contention determination process. As shown in FIG. 7, diagram 700 may include power information 710, reference bandwidth 712, a threshold determination 720, a reference threshold $X_0$ 730, incoming signal measurements 740, an interference level quality computation 750, a measured metric Q 760, sensing bandwidth $B_S$ 762, threshold adjustment 764, and a threshold X 766. Diagram 700 also includes a contention slot busy determination or clear channel assessment (CCA) 770 and a CCA busy decision 780.

As shown in FIG. 7, a reference bandwidth $B_0$ 712 and power information 710, e.g., power class and maximum transmit power, may be an input for threshold determination 720, which may produce a reference threshold 730, i.e., reference threshold $X_0(B_0, P_T)$. This reference threshold 730, along with a sensing bandwidth $B_S$ 762, may produce a threshold adjustment 764, e.g., $f(B_S, B_0)$. So the sensing bandwidth 762 may be used in conjunction with the reference bandwidth 712 to subsequently adjust the energy threshold, e.g., via threshold adjustment 764, which may correspond to threshold X 766. In some aspects, the reference bandwidth 712 may be greater than or equal to the sensing bandwidth 762.

As further shown in FIG. 7, incoming signal measurements 740 may be an input to an interference level quality computation 750, e.g., an energy measurement, which may produce a measured metric Q 760, e.g., energy. The measured metric Q 760 and threshold X 766 may be utilized in a contention slot busy determination 770, e.g., a clear channel assessment (CCA) 770. This contention slot busy determination or CCA 770 may result in CCA busy decision 780. The CCA busy decision 780 may be a true or false answer depending on if metric Q 760 is greater than or equal to threshold X 766.

FIGS. 8A, 8B, 8C, 8D, and 8E are graphs 800, 820, 840, 860, and 880, respectively, illustrating a reference threshold compared to a sensing bandwidth. As shown in FIGS. 8A-8E, aspects of the present disclosure may include a number of options for threshold adjustments. For instance, aspects of the present disclosure may include threshold adjustments for a given maximum EIRP.

FIG. 8A is a graph 800 illustrating a reference threshold 802 (dBm) compared to a sensing bandwidth 804 (log scale), which also includes reference bandwidth $B_0$ 806. As shown in FIG. 8A, the energy threshold $X_0(B_0, P_T)$ 808 may be increased as the sensing bandwidth 804 increases. For example, $$X_{Thresh} = X_0(B_0, P_T) + 10\log 10\left(\frac{B_S}{B0}\right).$$

This function may promote channels access for nodes that sense a wider bandwidth. For instance, when the energy threshold increases, the availability of the transmission medium may likewise increase.

FIG. 8B is a graph 820 illustrating a reference threshold 822 (dBm) compared to a sensing bandwidth 824 (log scale), which also includes reference bandwidth $B_0$ 826. As shown in FIG. 8B, the energy threshold $X_0(B_0, P_T)$ 828 may be decreased as the sensing bandwidth 824 increases. For example, $$X_{Thresh} = X_0(B_0, P_T) - 10\log 10\left(\frac{B_S}{B0}\right).$$

This function may encourage nodes to sense and transmit on narrower bandwidths. So this function may promote the nodes to occupy a reduced amount of bandwidth, in order to increase the amount of nodes that may utilize the medium. This may correspond to use cases that utilize smaller bandwidths.

FIG. 8C is a graph 840 illustrating a reference threshold 842 (dBm) compared to a sensing bandwidth 844 (log scale), which also includes reference bandwidth $B_0$ 846. As shown in FIG. 8C, energy threshold $X_0(B_0, P_T)$ 848 may be a monotonic, non-increasing function with lower clipping. For instance, the energy detection threshold 848 may be a non-increasing function with a minimum threshold. For example, $$X_{Thresh} = X_0(B_0, P_T) + f_1\left(\frac{B_S}{B_0}\right).$$

This function may promote channel access for sensing bandwidths lower than $B_0$.

FIG. 8D is a graph 860 illustrating a reference threshold 862 (dBm) compared to a sensing bandwidth 864 (log scale), which also includes reference bandwidth $B_0$ 866. As shown in FIG. 8D, energy threshold $X_0(B_0, P_T)$ 868 may be a monotonic, non-decreasing function of sensing bandwidth, e.g., with upper clipping. For instance, the energy detection threshold 868 may be a non-decreasing function with a maximum threshold. For example, $$X_{Thresh} = X_0(B_0, P_T) + f_2\left(\frac{B_S}{B_0}\right).$$

This function may promote channel access for sensing bandwidths larger than $B_0$.

FIG. 8E is a graph 880 illustrating a reference threshold 882 (dBm) compared to a sensing bandwidth 884 (log scale), which also includes reference bandwidth $B_0$ 886. As shown in FIG. 8E, energy threshold $X_0(B_0, P_T)$ 888 may be a function with single peak for a sensing bandwidth. For instance, the energy detection threshold 888 may increase prior to a peak value, and the energy detection threshold 888 may decrease after the peak value. For example, $$X_{Thresh} = X_0(B_0, P_T) + f_3\left(\frac{B_S}{B_0}\right).$$

This function may encourage the use of a sensing bandwidth equal to $B_0$, as well as be a way to accomplish decentralized agreements for sensing bandwidths.

Moreover, aspects of the present disclosure may include a function with a single valley for a sensing bandwidth. For instance, the energy detection threshold may decrease prior to a minimum value, and the energy detection threshold may increase after the minimum value. Aspects of the present disclosure may also include a number of UE specific threshold adjustment options. In some aspects, a UE sensing threshold may be adjusted for an active BWP bandwidth relative to the reference bandwidth $B_0$. This adjustment may include a general expression, where $$X_{Thresh} = X_0(B_0, P_T) + f\left(\frac{B_{BWP}}{B0}\right).$$

This adjustment may also include linear scaling, where $$X_{Thresh} = X_0(B_0, P_T) - 10\log 10\left(\frac{B_{BWP}}{B0}\right).$$

In some aspects, there may be signaling where a UE receives a reference bandwidth from the base station. The reference bandwidth may be obtained via remaining minimum system information (RMSI), radio resource control (RRC) signaling, medium access control (MAC) control element (MAC-CE) signaling, or downlink control information (DCI). Aspects of the present disclosure may also include signaling where a UE obtains a reference bandwidth by specification, e.g., the reference bandwidth is known or obtained by the UE, and the UE receives the bandwidth adjustment from a base station. The reference bandwidth may be obtained via RMSI, RRC signaling, MAC-CE signaling, or DCI.

Further, aspects of the present disclosure may include a UE sensing threshold that is adjusted for a union of one or more configured BWP bandwidths relative to the reference bandwidth $B_0$.

Aspects of the present disclosure may also include a UE sensing threshold that is adjusted for active BWP bandwidths relative to the network operating channel bandwidth $B_{gNB}$. For example, $$X_{Thresh} = X_0(B_{gNB}, P_T) - f\left(\frac{B_{BWP}}{B_{gNB}}\right).$$

Aspects of the present disclosure may also include signaling where a UE receives a network operating channel bandwidth from a base station. This may be performed via RMSI, RRC signaling, MAC-CE signaling, or DCI. Aspects of the present disclosure may also include signaling where a UE obtains a network operating channel bandwidth via RMSI and/or receives the bandwidth adjustment from a base station. This may also be performed via RMSI, RRC signaling, MAC-CE signaling, or DCI.

Figure 9:
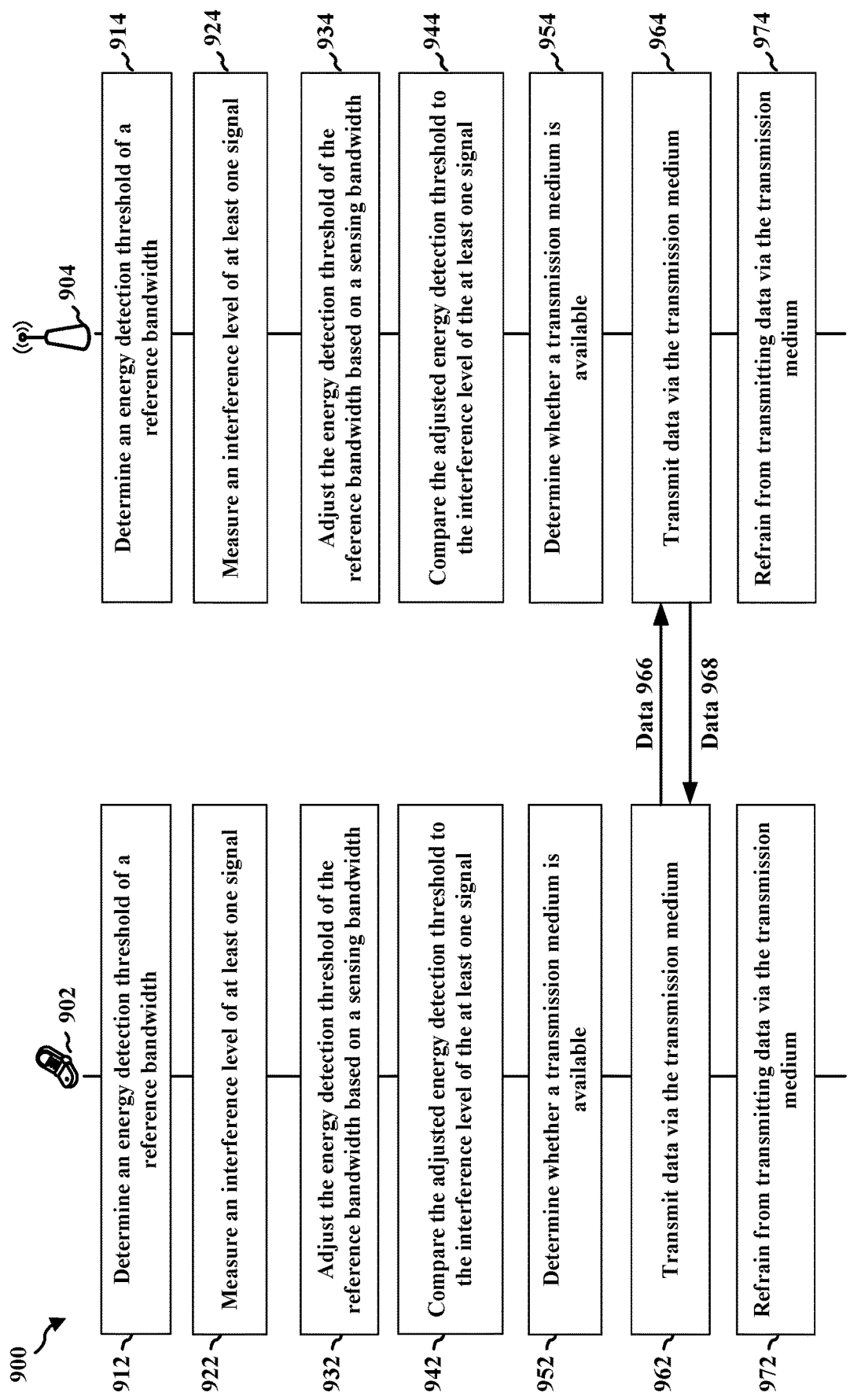
FIG. 9 is a diagram illustrating example communication between a UE and a base station in accordance with one or more techniques of the present disclosure.

FIG. 9 is a diagram 900 illustrating example communication between a UE 902 and a base station 904.

At 912, UE 902 may determine an energy detection threshold of a reference bandwidth, the energy detection threshold being based on at least one of a transmit power or a power class. At 914, base station 904 may determine an energy detection threshold of a reference bandwidth, the energy detection threshold being based on at least one of a transmit power or a power class.

At 922, UE 902 may measure an interference level of at least one signal. At 924, base station 904 may measure an interference level of at least one signal.

At 932, UE 902 may adjust the energy detection threshold of the reference bandwidth based on a sensing bandwidth. At 934, base station 904 may adjust the energy detection threshold of the reference bandwidth based on a sensing bandwidth.

At 942, UE 902 may compare the adjusted energy detection threshold to the measured interference level of the at least one signal. At 944, base station 904 may compare the adjusted energy detection threshold to the measured interference level of the at least one signal. In some aspects, the transmission medium may be available when the measured interference level of the at least one signal is less than the adjusted energy detection threshold.

In some aspects, the energy detection threshold may be increased when the sensing bandwidth increases. Also, the energy detection threshold may be decreased when the sensing bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

Additionally, the energy detection threshold may be adjusted based on at least one active bandwidth part (BWP) bandwidth associated with the reference bandwidth. The reference bandwidth may be received from a base station and/or a UE. The reference bandwidth may also be obtained by the UE and/or the base station, and the adjusted energy detection threshold may be received from a base station and/or a UE. Moreover, the energy detection threshold may be adjusted based on a union of one or more configured bandwidth part (BWP) bandwidths associated with the reference bandwidth. Also, the energy detection threshold may be adjusted based on at least one active bandwidth part (BWP) bandwidth associated with a network operating channel bandwidth. The network operating channel bandwidth may be received from a base station and/or a UE. The network operating channel bandwidth may also be obtained by the UE and/or the base station, and the adjusted energy detection threshold may be received from a base station and/or a UE.

At 952, UE 902 may determine whether a transmission medium is available based on at least one of the adjusted energy detection threshold or the measured interference level of the at least one signal. At 954, base station 904 may determine whether a transmission medium is available based on at least one of the adjusted energy detection threshold or the measured interference level of the at least one signal. In some aspects, the transmission medium may correspond to one or more transmission slots, and the measured interference level of the at least one signal corresponds to one or more contention slots.

At 962, UE 902 may transmit data, e.g., data 966, via the transmission medium when the measured interference level of the at least one signal is less than the adjusted energy detection threshold. At 964, base station 904 may transmit data, e.g., data 968, via the transmission medium when the measured interference level of the at least one signal is less than the adjusted energy detection threshold.

At 972, UE 902 may refrain from transmitting data via the transmission medium when the measured interference level of the at least one signal is greater than or equal to the adjusted energy detection threshold. At 974, base station 904 may refrain from transmitting data via the transmission medium when the measured interference level of the at least one signal is greater than or equal to the adjusted energy detection threshold.

Figure 10:
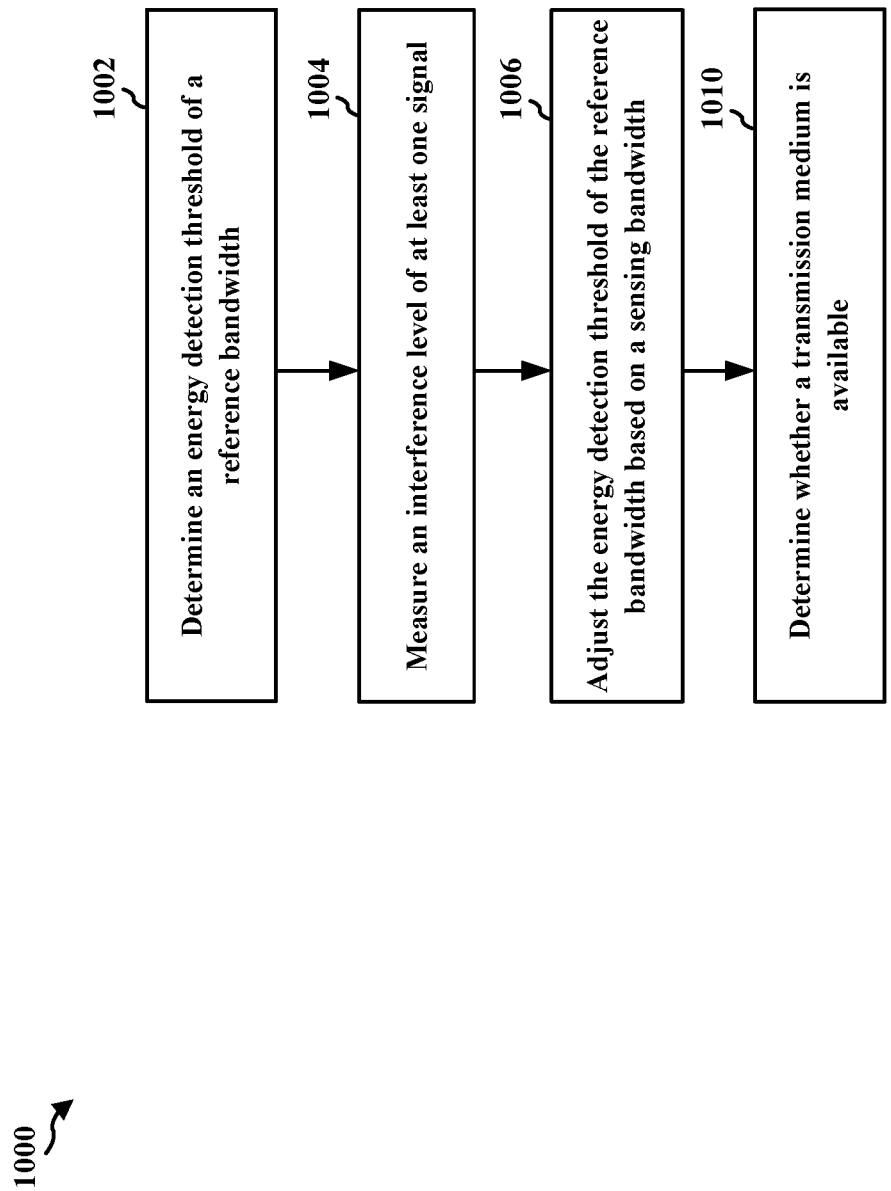
FIG. 10 is a flowchart of a method of wireless communication.

FIG. 10 is a flowchart 1000 of a method of wireless communication. The method may be performed by a UE or a component of a UE (e.g., the UE 104, 350, 902; the apparatus 1402; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1002, the apparatus may determine an energy detection threshold of a reference bandwidth, the energy detection threshold being based on at least one of a transmit power or a power class, as described in connection with the examples in FIGS. 4, 5A, 5B, 6, 7, 8A-8E, and 9. For example, UE 902 may determine an energy detection threshold of a reference bandwidth, the energy detection threshold being based on at least one of a transmit power or a power class, as described in connection with 912 in FIG. 9. Further, 1002 may be performed by determination component 1440 in FIG. 14.

At 1004, the apparatus may measure an interference level of at least one signal, as described in connection with the examples in FIGS. 4, 5A, 5B, 6, 7, 8A-8E, and 9. For example, UE 902 may measure an interference level of at least one signal, as described in connection with 922 in FIG. 9. Further, 1004 may be performed by determination component 1440 in FIG. 14.

At 1006, the apparatus may adjust the energy detection threshold of the reference bandwidth based on a sensing bandwidth, as described in connection with the examples in FIGS. 4, 5A, 5B, 6, 7, 8A-8E, and 9. For example, UE 902 may adjust the energy detection threshold of the reference bandwidth based on a sensing bandwidth, as described in connection with 932 in FIG. 9. Further, 1006 may be performed by determination component 1440 in FIG. 14.

In some aspects, the energy detection threshold may be increased when the sensing bandwidth increases. Also, the energy detection threshold may be decreased when the sensing bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

Additionally, the energy detection threshold may be adjusted based on at least one active bandwidth part (BWP) bandwidth associated with the reference bandwidth. The reference bandwidth may be received from a base station and/or a UE. The reference bandwidth may also be obtained by the UE and/or the base station, and the adjusted energy detection threshold may be received from a base station and/or a UE. Moreover, the energy detection threshold may be adjusted based on a union of one or more configured bandwidth part (BWP) bandwidths associated with the reference bandwidth. Also, the energy detection threshold may be adjusted based on at least one active bandwidth part (BWP) bandwidth associated with a network operating channel bandwidth. The network operating channel bandwidth may be received from a base station and/or a UE. The network operating channel bandwidth may also be obtained by the UE and/or the base station, and the adjusted energy detection threshold may be received from a base station and/or a UE.

At 1010, the apparatus may determine whether a transmission medium is available based on at least one of the adjusted energy detection threshold or the measured interference level of the at least one signal, as described in connection with the examples in FIGS. 4, 5A, 5B, 6, 7, 8A-8E, and 9. For example, UE 902 may determine whether a transmission medium is available based on at least one of the adjusted energy detection threshold or the measured interference level of the at least one signal, as described in connection with 952 in FIG. 9. Further, 1010 may be performed by determination component 1440 in FIG. 14. In some aspects, the transmission medium may correspond to one or more transmission slots, and the measured interference level of the at least one signal may correspond to one or more contention slots.

Figure 11:
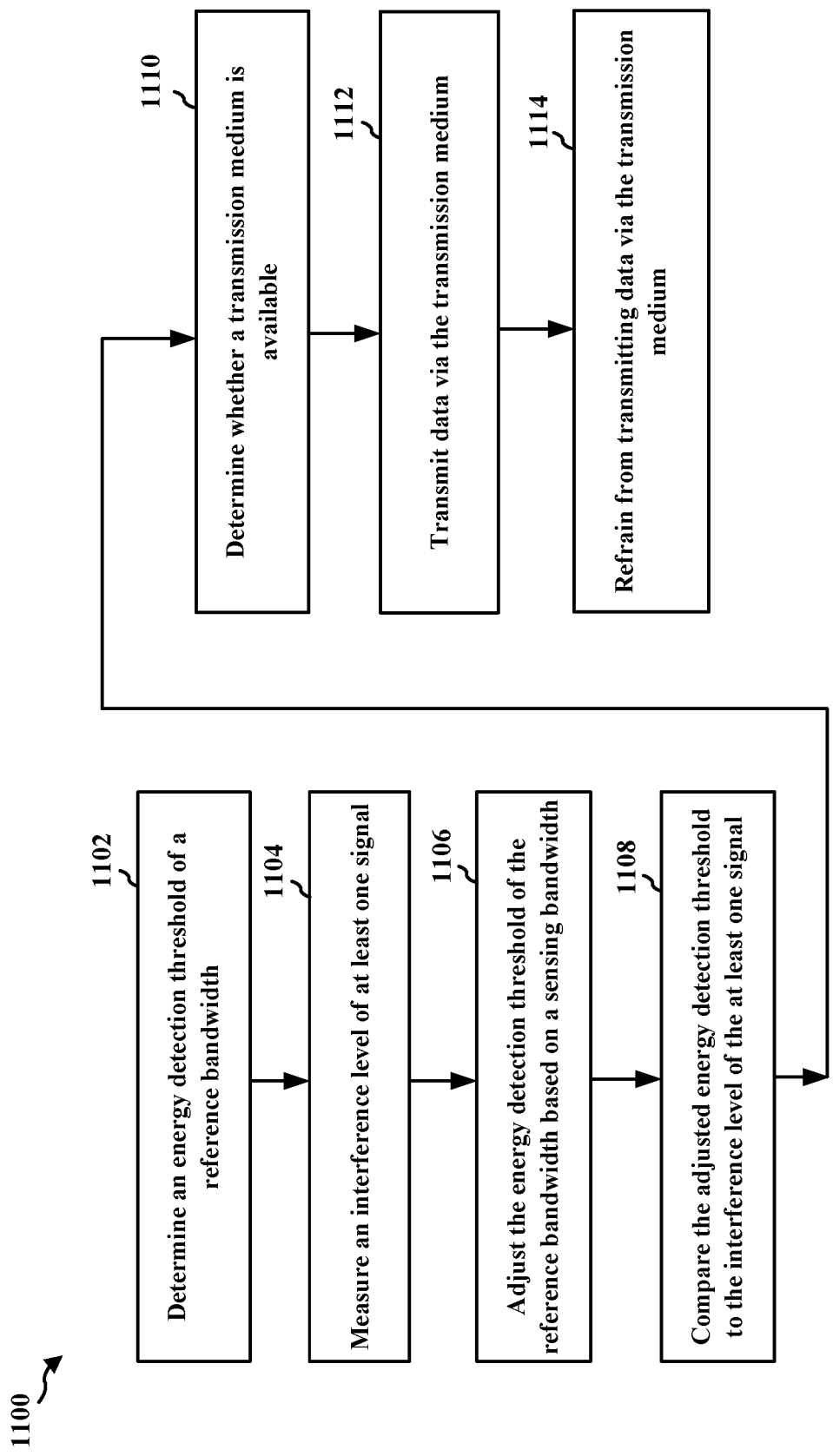
FIG. 11 is a flowchart of a method of wireless communication.

FIG. 11 is a flowchart 1100 of a method of wireless communication. The method may be performed by a UE or a component of a UE (e.g., the UE 104, 350, 902; the apparatus 1402; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1102, the apparatus may determine an energy detection threshold of a reference bandwidth, the energy detection threshold being based on at least one of a transmit power or a power class, as described in connection with the examples in FIGS. 4, 5A, 5B, 6, 7, 8A-8E, and 9. For example, UE 902 may determine an energy detection threshold of a reference bandwidth, the energy detection threshold being based on at least one of a transmit power or a power class, as described in connection with 912 in FIG. 9. Further, 1102 may be performed by determination component 1440 in FIG. 14.

At 1104, the apparatus may measure an interference level of at least one signal, as described in connection with the examples in FIGS. 4, 5A, 5B, 6, 7, 8A-8E, and 9. For example, UE 902 may measure an interference level of at least one signal, as described in connection with 922 in FIG. 9. Further, 1104 may be performed by determination component 1440 in FIG. 14.

At 1106, the apparatus may adjust the energy detection threshold of the reference bandwidth based on a sensing bandwidth, as described in connection with the examples in FIGS. 4, 5A, 5B, 6, 7, 8A-8E, and 9. For example, UE 902 may adjust the energy detection threshold of the reference bandwidth based on a sensing bandwidth, as described in connection with 932 in FIG. 9. Further, 1106 may be performed by determination component 1440 in FIG. 14.

At 1108, the apparatus may compare the adjusted energy detection threshold to the measured interference level of the at least one signal, as described in connection with the examples in FIGS. 4, 5A, 5B, 6, 7, 8A-8E, and 9. For example, UE 902 may compare the adjusted energy detection threshold to the measured interference level of the at least one signal, as described in connection with 942 in FIG. 9. Further, 1108 may be performed by determination component 1440 in FIG. 14. In some aspects, the transmission medium may be available when the measured interference level of the at least one signal is less than the adjusted energy detection threshold.

In some aspects, the energy detection threshold may be increased when the sensing bandwidth increases. Also, the energy detection threshold may be decreased when the sensing bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

Additionally, the energy detection threshold may be adjusted based on at least one active bandwidth part (BWP) bandwidth associated with the reference bandwidth. The reference bandwidth may be received from a base station and/or a UE. The reference bandwidth may also be obtained by the UE and/or the base station, and the adjusted energy detection threshold may be received from a base station and/or a UE. Moreover, the energy detection threshold may be adjusted based on a union of one or more configured bandwidth part (BWP) bandwidths associated with the reference bandwidth. Also, the energy detection threshold may be adjusted based on at least one active bandwidth part (BWP) bandwidth associated with a network operating channel bandwidth. The network operating channel bandwidth may be received from a base station and/or a UE. The network operating channel bandwidth may also be obtained by the UE and/or the base station, and the adjusted energy detection threshold may be received from a base station and/or a UE.

At 1110, the apparatus may determine whether a transmission medium is available based on at least one of the adjusted energy detection threshold or the measured interference level of the at least one signal, as described in connection with the examples in FIGS. 4, 5A, 5B, 6, 7, 8A-8E, and 9. For example, UE 902 may determine whether a transmission medium is available based on at least one of the adjusted energy detection threshold or the measured interference level of the at least one signal, as described in connection with 952 in FIG. 9. Further, 1110 may be performed by determination component 1440 in FIG. 14. In some aspects, the transmission medium may correspond to one or more transmission slots, and the measured interference level of the at least one signal may correspond to one or more contention slots.

At 1112, the apparatus may transmit data via the transmission medium when the measured interference level of the at least one signal is less than the adjusted energy detection threshold, as described in connection with the examples in FIGS. 4, 5A, 5B, 6, 7, 8A-8E, and 9. For example, UE 902 may transmit data via the transmission medium when the measured interference level of the at least one signal is less than the adjusted energy detection threshold, as described in connection with 962 in FIG. 9. Further, 1112 may be performed by determination component 1440 in FIG. 14.

At 1114, the apparatus may refrain from transmitting data via the transmission medium when the measured interference level of the at least one signal is greater than or equal to the adjusted energy detection threshold, as described in connection with the examples in FIGS. 4, 5A, 5B, 6, 7, 8A-8E, and 9. For example, UE 902 may refrain from transmitting data via the transmission medium when the measured interference level of the at least one signal is greater than or equal to the adjusted energy detection threshold, as described in connection with 972 in FIG. 9. Further, 1114 may be performed by determination component 1440 in FIG. 14.

Figure 12:
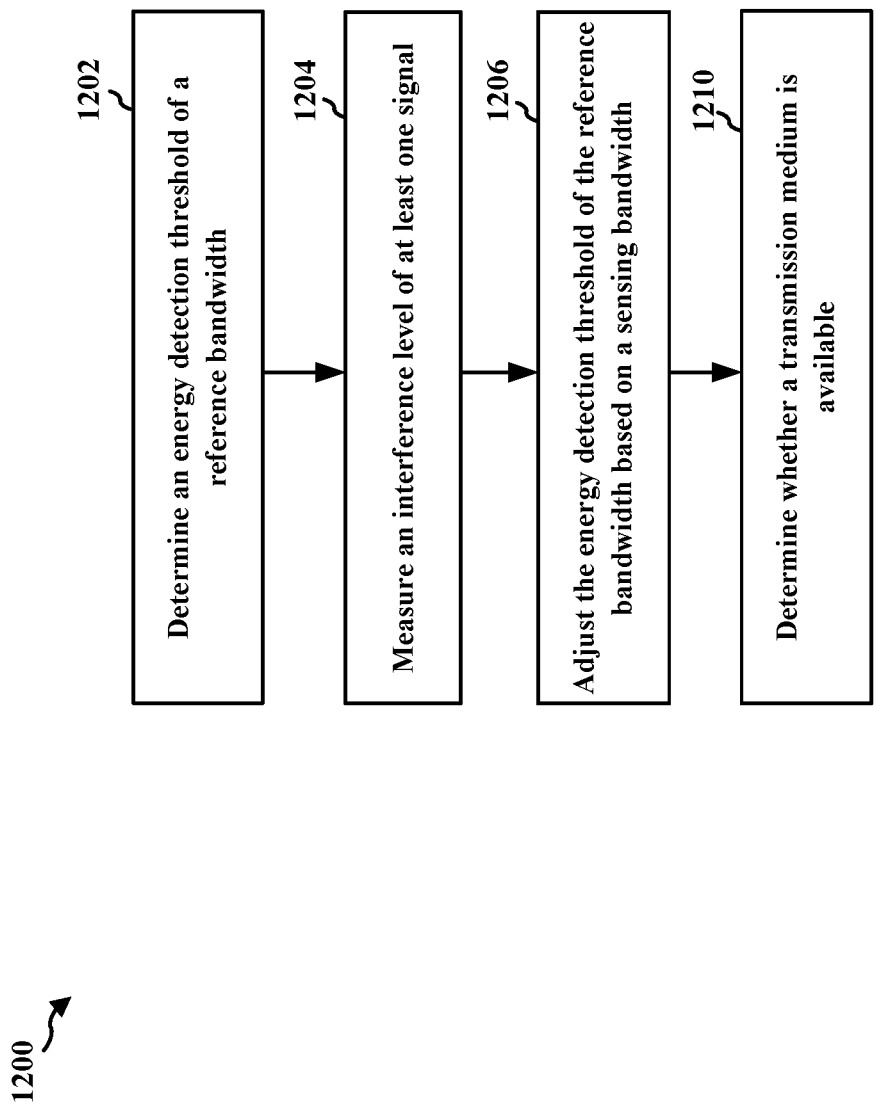
FIG. 12 is a flowchart of a method of wireless communication.

FIG. 12 is a flowchart 1200 of a method of wireless communication. The method may be performed by a base station or a component of a base station (e.g., the base station 102, 180, 310, 904; the apparatus 1502; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1202, the apparatus may determine an energy detection threshold of a reference bandwidth, the energy detection threshold being based on at least one of a transmit power or a power class, as described in connection with the examples in FIGS. 4, 5A, 5B, 6, 7, 8A-8E, and 9. For example, base station 904 may determine an energy detection threshold of a reference bandwidth, the energy detection threshold being based on at least one of a transmit power or a power class, as described in connection with 914 in FIG. 9. Further, 1202 may be performed by determination component 1540 in FIG. 15.

At 1204, the apparatus may measure an interference level of at least one signal, as described in connection with the examples in FIGS. 4, 5A, 5B, 6, 7, 8A-8E, and 9. For example, base station 904 may measure an interference level of at least one signal, as described in connection with 924 in FIG. 9. Further, 1204 may be performed by determination component 1540 in FIG. 15.

At 1206, the apparatus may adjust the energy detection threshold of the reference bandwidth based on a sensing bandwidth, as described in connection with the examples in FIGS. 4, 5A, 5B, 6, 7, 8A-8E, and 9. For example, base station 904 may adjust the energy detection threshold of the reference bandwidth based on a sensing bandwidth, as described in connection with 934 in FIG. 9. Further, 1206 may be performed by determination component 1540 in FIG. 15.

In some aspects, the energy detection threshold may be increased when the sensing bandwidth increases. Also, the energy detection threshold may be decreased when the sensing bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

At 1210, the apparatus may determine whether a transmission medium is available based on at least one of the adjusted energy detection threshold or the measured interference level of the at least one signal, as described in connection with the examples in FIGS. 4, 5A, 5B, 6, 7, 8A-8E, and 9. For example, base station 904 may determine whether a transmission medium is available based on at least one of the adjusted energy detection threshold or the measured interference level of the at least one signal, as described in connection with 954 in FIG. 9. Further, 1210 may be performed by determination component 1540 in FIG. 15. In some aspects, the transmission medium may correspond to one or more transmission slots, and the measured interference level of the at least one signal may correspond to one or more contention slots.

Figure 13:
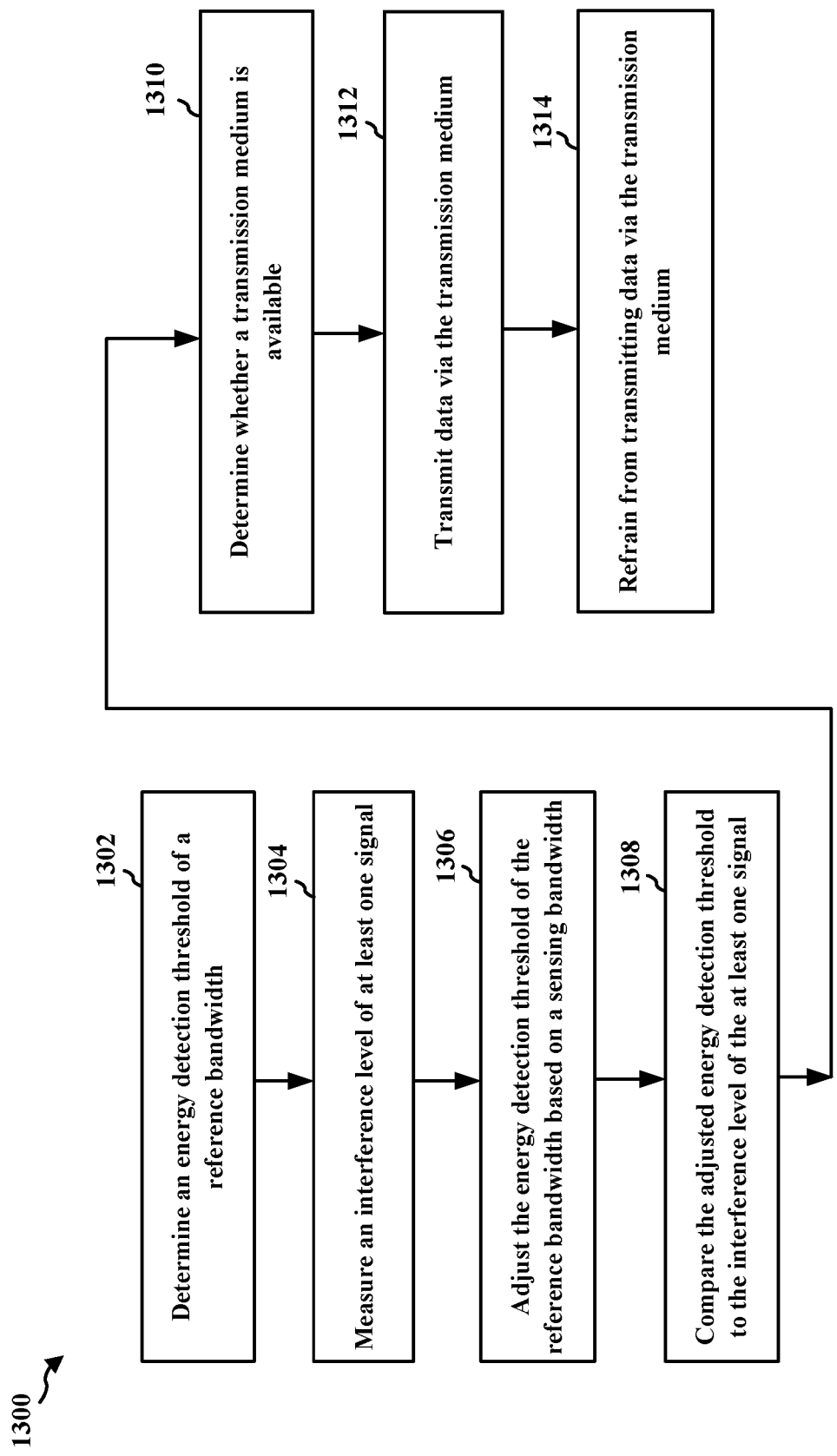
FIG. 13 is a flowchart of a method of wireless communication.

FIG. 13 is a flowchart 1300 of a method of wireless communication. The method may be performed by a base station or a component of a base station (e.g., the base station 102, 180, 310, 904; the apparatus 1502; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1302, the apparatus may determine an energy detection threshold of a reference bandwidth, the energy detection threshold being based on at least one of a transmit power or a power class, as described in connection with the examples in FIGS. 4, 5A, 5B, 6, 7, 8A-8E, and 9. For example, base station 904 may determine an energy detection threshold of a reference bandwidth, the energy detection threshold being based on at least one of a transmit power or a power class, as described in connection with 914 in FIG. 9. Further, 1302 may be performed by determination component 1540 in FIG. 15.

At 1304, the apparatus may measure an interference level of at least one signal, as described in connection with the examples in FIGS. 4, 5A, 5B, 6, 7, 8A-8E, and 9. For example, base station 904 may measure an interference level of at least one signal, as described in connection with 924 in FIG. 9. Further, 1304 may be performed by determination component 1540 in FIG. 15.

At 1306, the apparatus may adjust the energy detection threshold of the reference bandwidth based on a sensing bandwidth, as described in connection with the examples in FIGS. 4, 5A, 5B, 6, 7, 8A-8E, and 9. For example, base station 904 may adjust the energy detection threshold of the reference bandwidth based on a sensing bandwidth, as described in connection with 934 in FIG. 9. Further, 1306 may be performed by determination component 1540 in FIG. 15.

At 1308, the apparatus may compare the adjusted energy detection threshold to the measured interference level of the at least one signal, as described in connection with the examples in FIGS. 4, 5A, 5B, 6, 7, 8A-8E, and 9. For example, base station 904 may compare the adjusted energy detection threshold to the measured interference level of the at least one signal, as described in connection with 944 in FIG. 9. Further, 1308 may be performed by determination component 1540 in FIG. 15. In some aspects, the transmission medium may be available when the measured interference level of the at least one signal is less than the adjusted energy detection threshold.

In some aspects, the energy detection threshold may be increased when the sensing bandwidth increases. Also, the energy detection threshold may be decreased when the sensing bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

At 1310, the apparatus may determine whether a transmission medium is available based on at least one of the adjusted energy detection threshold or the measured interference level of the at least one signal, as described in connection with the examples in FIGS. 4, 5A, 5B, 6, 7, 8A-8E, and 9. For example, base station 904 may determine whether a transmission medium is available based on at least one of the adjusted energy detection threshold or the measured interference level of the at least one signal, as described in connection with 954 in FIG. 9. Further, 1310 may be performed by determination component 1540 in FIG. 15. In some aspects, the transmission medium may correspond to one or more transmission slots, and the measured interference level of the at least one signal may correspond to one or more contention slots.

At 1312, the apparatus may transmit data via the transmission medium when the measured interference level of the at least one signal is less than the adjusted energy detection threshold, as described in connection with the examples in FIGS. 4, 5A, 5B, 6, 7, 8A-8E, and 9. For example, base station 904 may transmit data via the transmission medium when the measured interference level of the at least one signal is less than the adjusted energy detection threshold, as described in connection with 964 in FIG. 9. Further, 1312 may be performed by determination component 1540 in FIG. 15.

At 1314, the apparatus may refrain from transmitting data via the transmission medium when the measured interference level of the at least one signal is greater than or equal to the adjusted energy detection threshold, as described in connection with the examples in FIGS. 4, 5A, 5B, 6, 7, 8A-8E, and 9. For example, base station 904 may refrain from transmitting data via the transmission medium when the measured interference level of the at least one signal is greater than or equal to the adjusted energy detection threshold, as described in connection with 974 in FIG. 9. Further, 1314 may be performed by determination component 1540 in FIG. 15.

Figure 14:
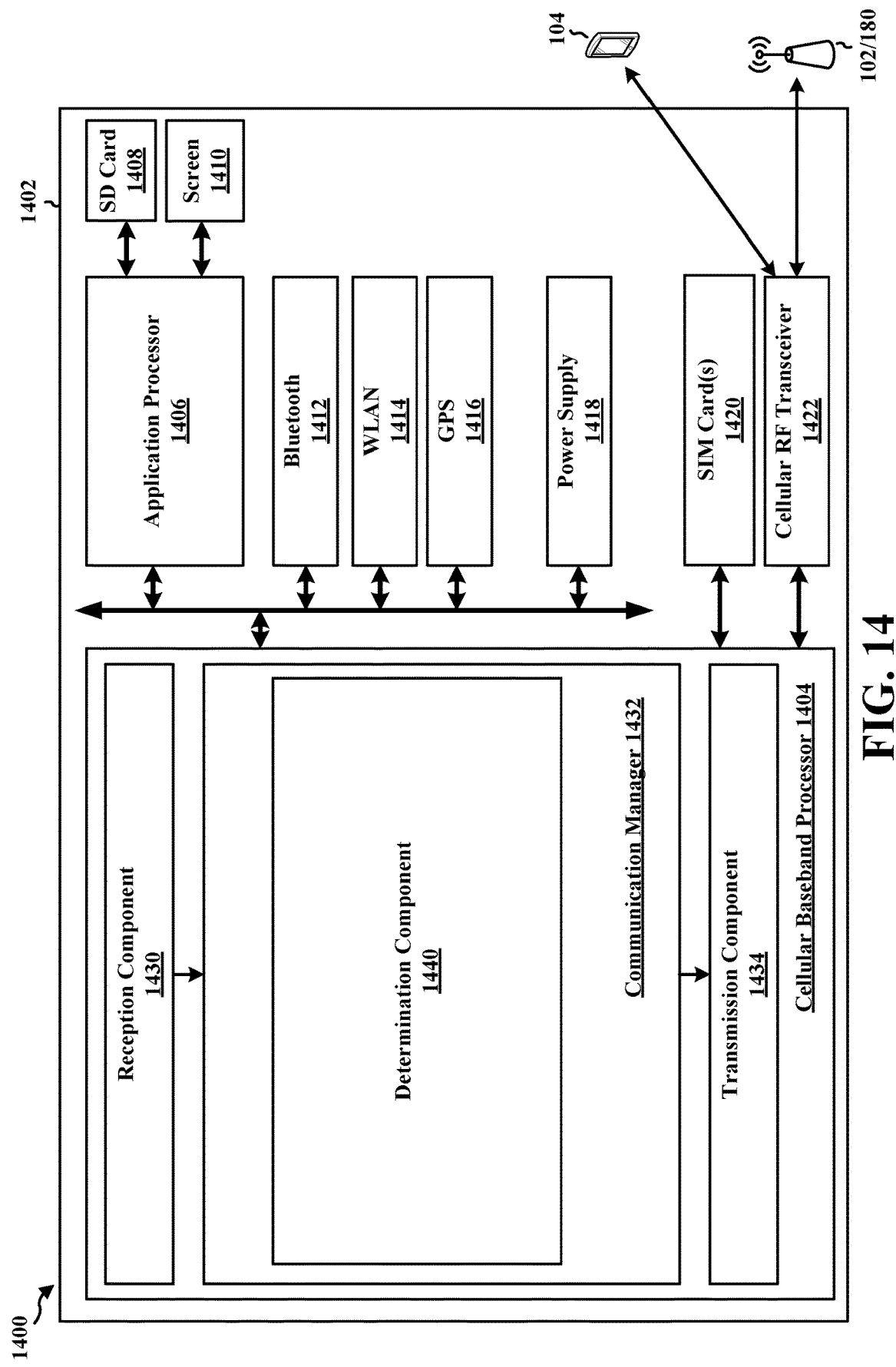
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a determination component 1440 that is configured to determine an energy detection threshold of a reference bandwidth, the energy detection threshold being based on at least one of a transmit power or a power class, e.g., as described in connection with step 1102 above. Determination component 1440 may also be configured to measure an interference level of at least one signal, e.g., as described in connection with step 1104 above. Determination component 1440 may also be configured to adjust the energy detection threshold of the reference bandwidth based on a sensing bandwidth, e.g., as described in connection with step 1106 above. Determination component 1440 may also be configured to compare the adjusted energy detection threshold to the measured interference level of the at least one signal, e.g., as described in connection with step 1108 above. Determination component 1440 may also be configured to determine whether a transmission medium is available based on at least one of the adjusted energy detection threshold or the measured interference level of the at least one signal, e.g., as described in connection with step 1110 above. Determination component 1440 may also be configured to transmit data via the transmission medium when the measured interference level of the at least one signal is less than the adjusted energy detection threshold, e.g., as described in connection with step 1112 above. Determination component 1440 may also be configured to refrain from transmitting data via the transmission medium when the measured interference level of the at least one signal is greater than or equal to the adjusted energy detection threshold, e.g., as described in connection with step 1114 above.

The apparatus may include additional components that perform each of the blocks of the algorithm in the aforementioned flowcharts of FIGS. 9, 10, and 11. As such, each block in the aforementioned flowcharts of FIGS. 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for determining an energy detection threshold of a reference bandwidth, the energy detection threshold being based on at least one of a transmit power or a power class. The apparatus 1402 may also include means for measuring an interference level of at least one signal. The apparatus 1402 may also include means for adjusting the energy detection threshold of the reference bandwidth based on a sensing bandwidth. The apparatus 1402 may also include means for determining whether a transmission medium is available based on at least one of the adjusted energy detection threshold or the measured interference level of the at least one signal. The apparatus 1402 may also include means for comparing the adjusted energy detection threshold to the measured interference level of the at least one signal. The apparatus 1402 may also include means for transmitting data via the transmission medium when the measured interference level of the at least one signal is less than the adjusted energy detection threshold. The apparatus 1402 may also include means for refraining from transmitting data via the transmission medium when the measured interference level of the at least one signal is greater than or equal to the adjusted energy detection threshold. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
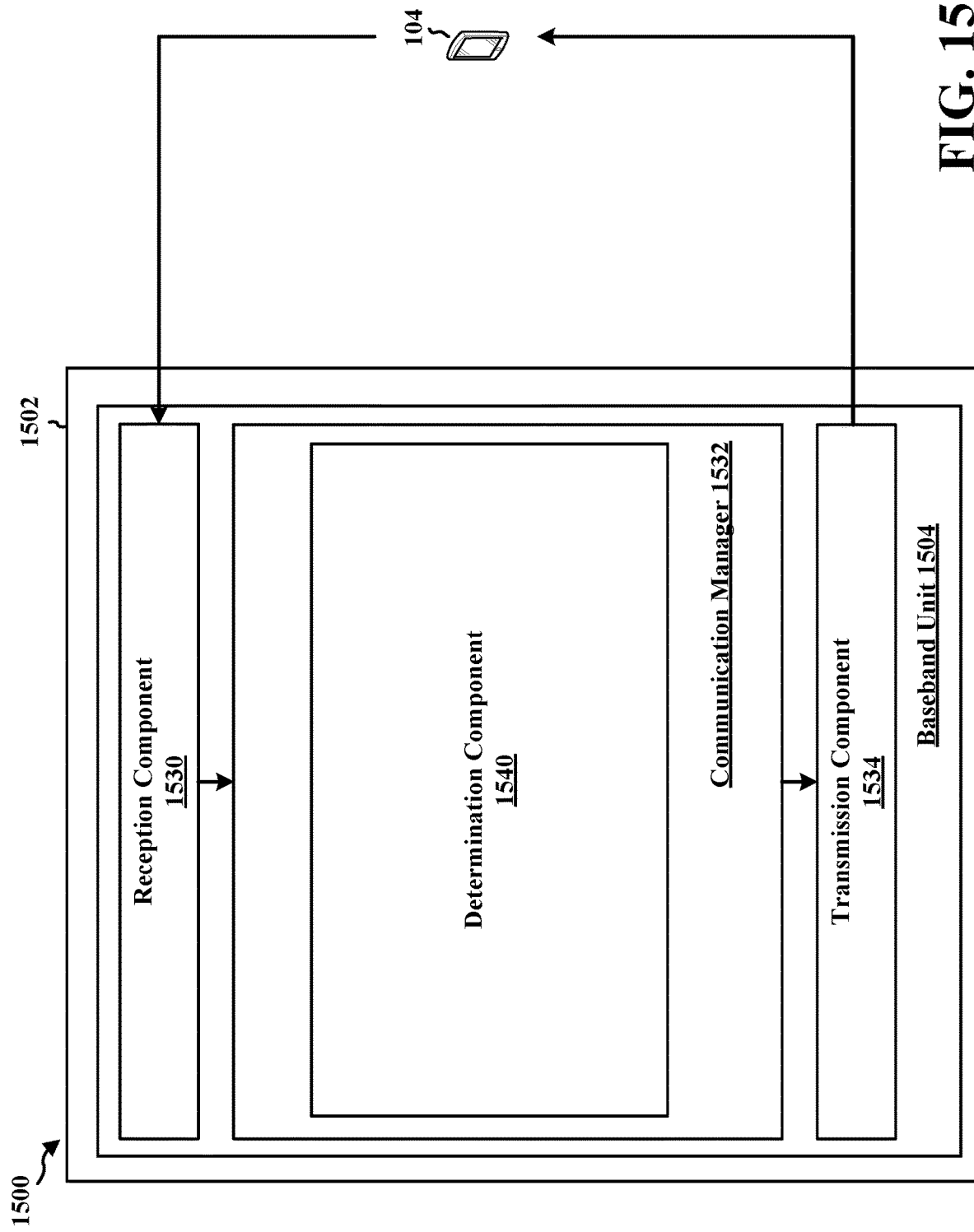
FIG. 15 is a diagram illustrating an example of a hardware implementation for an example apparatus.

FIG. 15 is a diagram 1500 illustrating an example of a hardware implementation for an apparatus 1502. The apparatus 1502 is a base station and includes a baseband unit 1504. The baseband unit 1504 may communicate through a cellular RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a determination component 1540 that is configured to determine an energy detection threshold of a reference bandwidth, the energy detection threshold being based on at least one of a transmit power or a power class, e.g., as described in connection with step 1302 above. Determination component 1540 may also be configured to measure an interference level of at least one signal, e.g., as described in connection with step 1304 above. Determination component 1540 may also be configured to adjust the energy detection threshold of the reference bandwidth based on a sensing bandwidth, e.g., as described in connection with step 1306 above. Determination component 1540 may also be configured to compare the adjusted energy detection threshold to the measured interference level of the at least one signal, e.g., as described in connection with step 1308 above. Determination component 1540 may also be configured to determine whether a transmission medium is available based on at least one of the adjusted energy detection threshold or the measured interference level of the at least one signal, e.g., as described in connection with step 1310 above. Determination component 1540 may also be configured to transmit data via the transmission medium when the measured interference level of the at least one signal is less than the adjusted energy detection threshold, e.g., as described in connection with step 1312 above. Determination component 1540 may also be configured to refrain from transmitting data via the transmission medium when the measured interference level of the at least one signal is greater than or equal to the adjusted energy detection threshold, e.g., as described in connection with step 1314 above.

The apparatus may include additional components that perform each of the blocks of the algorithm in the aforementioned flowcharts of FIGS. 9, 12, and 13. As such, each block in the aforementioned flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for determining an energy detection threshold of a reference bandwidth, the energy detection threshold being based on at least one of a transmit power or a power class. The apparatus 1502 may also include means for measuring an interference level of at least one signal. The apparatus 1502 may also include means for adjusting the energy detection threshold of the reference bandwidth based on a sensing bandwidth. The apparatus 1502 may also include means for determining whether a transmission medium is available based on at least one of the adjusted energy detection threshold or the measured interference level of the at least one signal. The apparatus 1502 may also include means for comparing the adjusted energy detection threshold to the measured interference level of the at least one signal. The apparatus 1502 may also include means for transmitting data via the transmission medium when the measured interference level of the at least one signal is less than the adjusted energy detection threshold. The apparatus 1502 may also include means for refraining from transmitting data via the transmission medium when the measured interference level of the at least one signal is greater than or equal to the adjusted energy detection threshold. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects provided herein provide a configuration for a channel access mechanism where a contending node may measure sensing measurement over a sensing bandwidth that is different from an eventual bandwidth of one or more intended transmissions. A profile of interference caused may be decided based on the bandwidth occupied by the transmission. Sensing thresholds may be adjusted to be used to compensate for a mismatch between the sensing bandwidth and the transmission bandwidth.

The impact of interference caused by potential transmission from a node contending for channel access may be different on a victim in instances where the interference is spread over a large or small number of frequency resources. In the decoding of ongoing transmissions, the impact may depend on a number of factors, such as error control coding rate, interleaving and decoder architecture, smaller versus larger codeblocks, or modulation and spreading. The rate prediction and channel state information (CSI) estimation may be affected by time domain predictability of the interference. The ability to avoid interference in the frequency domain may be based by scheduling and channel selection. As such, the sensing thresholds used for channel access may be a function of the size and nature of the transmission bandwidth to be occupied by the contending node for a give transmit power or EIRP, and may be adjusted relative to a threshold that assumes a matched sending and transmission bandwidth.

FIGS. 16A-16D are examples 1600, 1610, 1620, and 1630, respectively, of adjusted sensing thresholds. An occupied bandwidth 1604 may be the bandwidth determined by occupied resource blocks. The occupied bandwidth 1604 may be the sum of resource blocks to be occupied (e.g., contiguous or non-contiguous) during the proposed transmission. For example, the occupied bandwidth may be expressed as follows:

$$B_{Occupied} = \left\{ f : \text{smallest } PRBs \ r \text{ such that } a*P_T \leq \sum_r PSD(r) * B_{PRB}(r) \right\}$$

A span bandwidth or $B_{span}$ 1606 may be a bandwidth span of occupied resource blocks. For example, $B_{span}$ may be the smallest value of the difference between $f_{max}-f_{min}$, where the power radiated between $f_{min}$ and $f_{max}$ is greater than or equal to $a*P_T$, where $P_T$ is the transmit power. The sensing threshold $X_0$ may be the matched bandwidth threshold for sensing bandwidth $B_S$ and the total transmission power/EIRP $P_T$. The sensing threshold may be expressed as $X_0:=X_0(B_S, P_T)$. The sensing threshold may be adjusted to match the occupied bandwidth. In the example 1600 of FIG. 16A, the occupied bandwidth $B_{Occupied}$ 1604 may include a first bandwidth $B_1$ 1608 and a second bandwidth $B_2$ 1610. The first bandwidth $B_1$ 1608 and second bandwidth $B_2$ 1610 may be narrowband, predictable, contiguous, or localized such that the occupied bandwidth $B_{Occupied}$ 1604 occupies part of the sensing bandwidth $B_{sense}$ 1602 and a significant portion of the subbands may be empty. As such, the sensing threshold may be based on a ratio of the sensing bandwidth $B_{sense}$ 1602 and the occupied bandwidth $B_{Occupied}$ 1604. For example, the sensing threshold may be expressed as $$X_{Thresh} := X_0 * \left( \frac{B_S}{B_{occupied}} \right).$$

In the example 1610 of FIG. 16B, the occupied bandwidth may include a first bandwidth $B_1$ 1608 and a second bandwidth $B_2$ 1610. The first bandwidth $B_1$ 1608 and second bandwidth $B_2$ 1610 may be narrowband, predictable, non-contiguous, or localized such that the occupied bandwidth $B_{Occupied}$ 1604 occupies part of the sensing bandwidth $B_{sense}$ 1602 while the first bandwidth $B_1$ 1608 and second bandwidth $B_2$ 1610 are separated from each other. The first bandwidth $B_1$ 1608 and second bandwidth $B_2$ 1610 are separated from each other in instances where the wireless device is a base station communicating with different UEs such that first bandwidth $B_1$ 1608 corresponds to communication with a first UE and second bandwidth $B_2$ 1610 corresponds to communication with a second UE. In such instances, the sensing threshold may be based on a ratio of the sensing bandwidth $B_{sense}$ 1602 and the occupied bandwidth (e.g., $B_1$ 1608 and $B_2$ 1610). For example, the sensing threshold may be expressed as $$X_{Thresh} := X_0 * \left(\frac{B_S}{B_{occupied}}\right).$$

In the example 1620 of FIG. 16C, the occupied bandwidth may include a first bandwidth $B_1$ 1608 and a second bandwidth $B_2$ 1610. The first bandwidth $B_1$ 1608 and second bandwidth $B_2$ 1610 may be narrowband and unpredictable, such that frequency hopping is present. Due to the presence of frequency hopping, the first and second bandwidths may occupy a substantial amount of the sensing bandwidth over time. For example, at a first time slot the first bandwidth $B_1$ 1608 and second bandwidth $B_2$ 1610 may occupy a portion of the sensing bandwidth $B_{sense}$ 1602, while at a second time slot the first bandwidth $B_1$ 1608 and second bandwidth $B_2$ 1610 may occupy a different portion of the sensing bandwidth $B_{sense}$ 1602 such that over the combined time slots, the occupied bandwidth or bandwidth span $B_{span}$ 1606 is substantially similar to the sensing bandwidth. As such, the sensing threshold may be based on a ratio of the sensing bandwidth $B_{sense}$ 1602 and the bandwidth span $B_{span}$ 1606. For example, the sensing threshold may be expressed as $$X_{Thresh} := X_0 * \left(\frac{B_S}{B_{span}}\right).$$

In the example 1630 of FIG. 16D, the occupied bandwidth may include a plurality of first or second bandwidths that may be narrowband and/or non-localized, such that the plurality of first or second bandwidths may be spaced out within the sensing bandwidth. In such instances, the occupied bandwidth may include a bandwidth span $B_{span}$ 1606 that is substantially similar to the sensing bandwidth. As such, the sensing threshold may be based on a ratio of the sensing bandwidth $B_{sense}$ 1602 and the bandwidth span $B_{span}$ 1606. For example, the sensing threshold may be expressed as $$X_{Thresh} := X_0 * \left(\frac{B_S}{B_{span}}\right).$$

Figure 17:
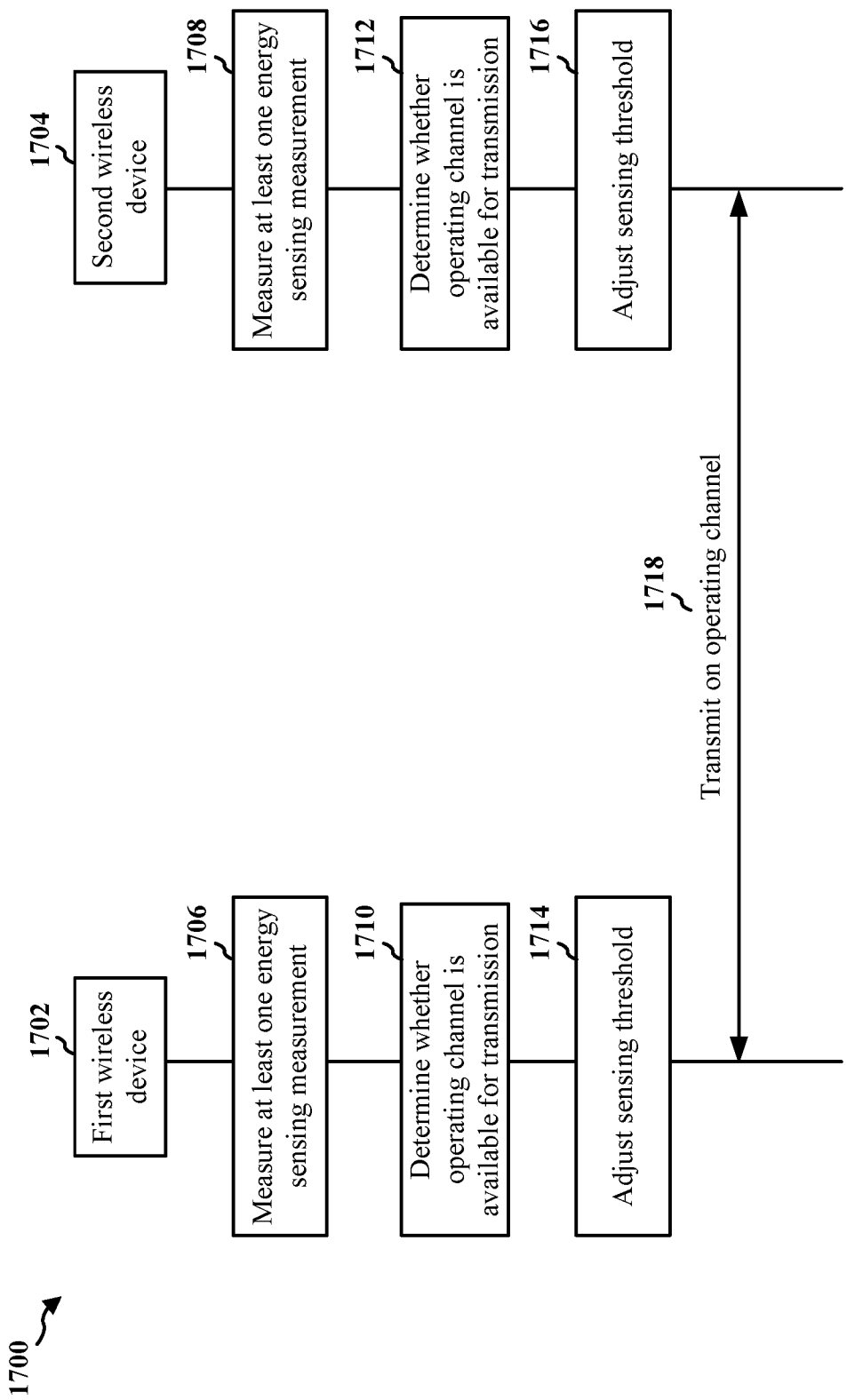
FIG. 17 is a call flow diagram of signaling between a first wireless device and a second wireless device in accordance with certain aspects of the disclosure.

FIG. 17 is a call flow diagram 1700 of signaling between a first wireless device 1702 and a second wireless device 1704. In some aspects, the first wireless device 1702 may be a UE or a base station. In some aspects, the second wireless device 1704 may be a base station or a UE. In aspects where the first or second wireless device is a base station, the base station may be configured to provide a cell. In aspects where the first or second wireless device is a UE, the UE may be configured to communicate with the base station. For example, in the context of FIG. 1, the base station may correspond to base station 102/180 and, accordingly, the cell may include a geographic coverage area 110 in which communication coverage is provided and/or small cell 102' having a coverage area 110'. Further, a UE may correspond to at least UE 104. In another example, in the context of FIG. 3, the base station may correspond to base station 310 and the UE may correspond to UE 350.

As illustrated at 1706, the first wireless device 1702 may measure at least one energy sensing measurement of an operating channel. The second wireless device 1704, as illustrated at 1708, may measure at least one energy sensing measurement of an operating channel. The wireless device may measure at least one energy sensing measurement of an operating channel within a sensing bandwidth. In some aspects, the wireless device may include a user equipment (UE). In some aspects, the wireless device may include a base station.

As illustrated at 1710, the first wireless device 1702 may determine whether the operating channel is available for transmission. The second wireless device 1704, as illustrated at 1712, may determine whether the operating channel is available for transmission. The wireless device may determine whether the operating channel is available for transmission based on a sensing threshold for a transmission power level for a transmission bandwidth. In some aspects, the transmission bandwidth may be different from the sensing bandwidth.

As illustrated at 1714, the first wireless device 1702 may adjust the sensing threshold. As illustrated at 1716, the second wireless device 1704 may adjust the sensing threshold. The wireless device may adjust the sensing threshold based on the sensing bandwidth and a bandwidth occupied by the transmission bandwidth. In some aspects, the sensing threshold may be adjusted to match the sensing bandwidth with the bandwidth occupied by the transmission bandwidth. The bandwidth occupied by the transmission bandwidth may include part of the sensing bandwidth. The sensing threshold may be adjusted based on the bandwidth occupied by the transmission bandwidth and the sensing bandwidth. In some aspects, the bandwidth occupied by the transmission bandwidth may be contiguous or localized. In some aspects, the bandwidth occupied by the transmission bandwidth may include a bandwidth span that is substantially similar to the sensing bandwidth. In such aspects, the sensing threshold may be adjusted based on the bandwidth span occupied by the transmission bandwidth and the sensing bandwidth. In some aspects, the bandwidth span occupied by the transmission bandwidth may be discontiguous, non-localized, or include frequency hopping.

As illustrated at 1718, the first wireless device 1702 or the second wireless device 1704 may transmit on the operating channel. The wireless device may transmit on the operating channel upon the determination that the operating channel is available for transmission for the transmission power level for the transmission bandwidth.

Figure 18:
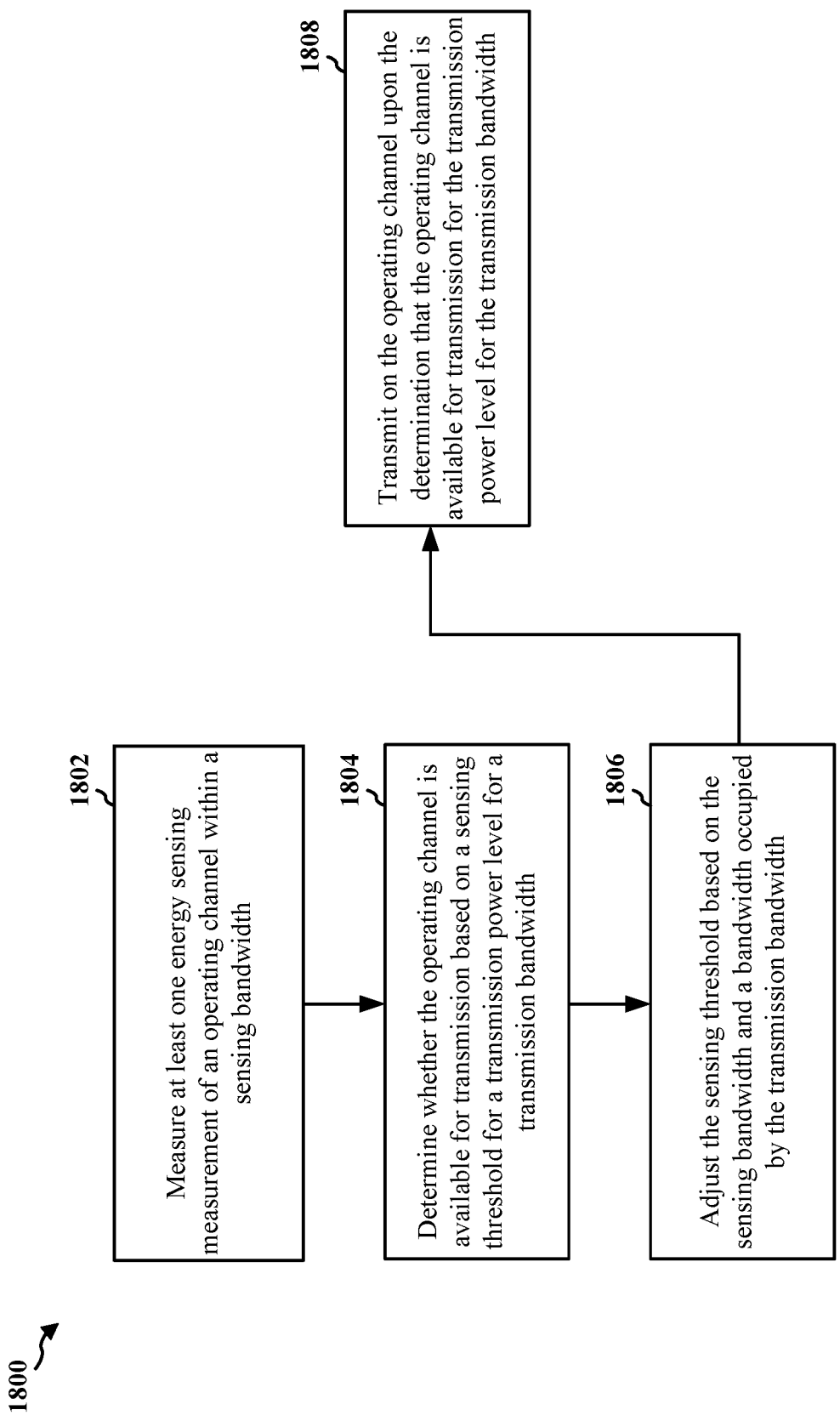
FIG. 18 is a flowchart of a method of wireless communication.

FIG. 18 is a flowchart 1800 of a method of wireless communication. The method may be performed by a UE or a component of a UE (e.g., the UE 104, 902; first wireless device 1702; the apparatus 1902; the cellular baseband processor 1904, which may include the memory 360 and which may be the entire UE 350 or a component of the UE 350, such as the TX processor 368, the RX processor 356, and/or the controller/processor 359). The method may be performed by a base station or a component of a base station (e.g., the base station 102/180, 904; second wireless device 1704; the apparatus 1902; the cellular baseband processor 1904, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a wireless device to perform a clear channel assessment where sensing measurements are measured over a sensing bandwidth that is different from the eventual bandwidth of one or more intended transmissions.

At 1802, the wireless device may measure at least one energy sensing measurement of an operating channel. For example, 1802 may be performed by measure component 1940 of apparatus 1902. The wireless device may measure at least one energy sensing measurement of an operating channel within a sensing bandwidth. In some aspects, the wireless device may include a user equipment (UE). In some aspects, the wireless device may include a base station.

At 1804, the wireless device may determine whether the operating channel is available for transmission. For example, 1804 may be performed by availability component 1942 of apparatus 1902. The wireless device may determine whether the operating channel is available for transmission based on a sensing threshold for a transmission power level for a transmission bandwidth. In some aspects, the transmission bandwidth may be different from the sensing bandwidth.

At 1806, the wireless device may adjust the sensing threshold. For example, 1806 may be performed by adjustment component 1944 of apparatus 1902. The wireless device may adjust the sensing threshold based on the sensing bandwidth and a bandwidth occupied by the transmission bandwidth. In some aspects, the sensing threshold may be adjusted to match the sensing bandwidth with the bandwidth occupied by the transmission bandwidth. The bandwidth occupied by the transmission bandwidth may include part of the sensing bandwidth. The sensing threshold may be adjusted based on the bandwidth occupied by the transmission bandwidth and the sensing bandwidth. In some aspects, the bandwidth occupied by the transmission bandwidth may be contiguous or localized. In some aspects, the bandwidth occupied by the transmission bandwidth may include a bandwidth span that is substantially similar to the sensing bandwidth. In such aspects, the sensing threshold may be adjusted based on the bandwidth span occupied by the transmission bandwidth and the sensing bandwidth. In some aspects, the bandwidth span occupied by the transmission bandwidth may be discontiguous, non-localized, or includes frequency hopping.

At 1808, the wireless device may transmit on the operating channel. For example, 1808 may be performed by channel component 1946 of apparatus 1902. The wireless device may transmit on the operating channel upon the determination that the operating channel is available for transmission for the transmission power level for the transmission bandwidth.

Figure 19:
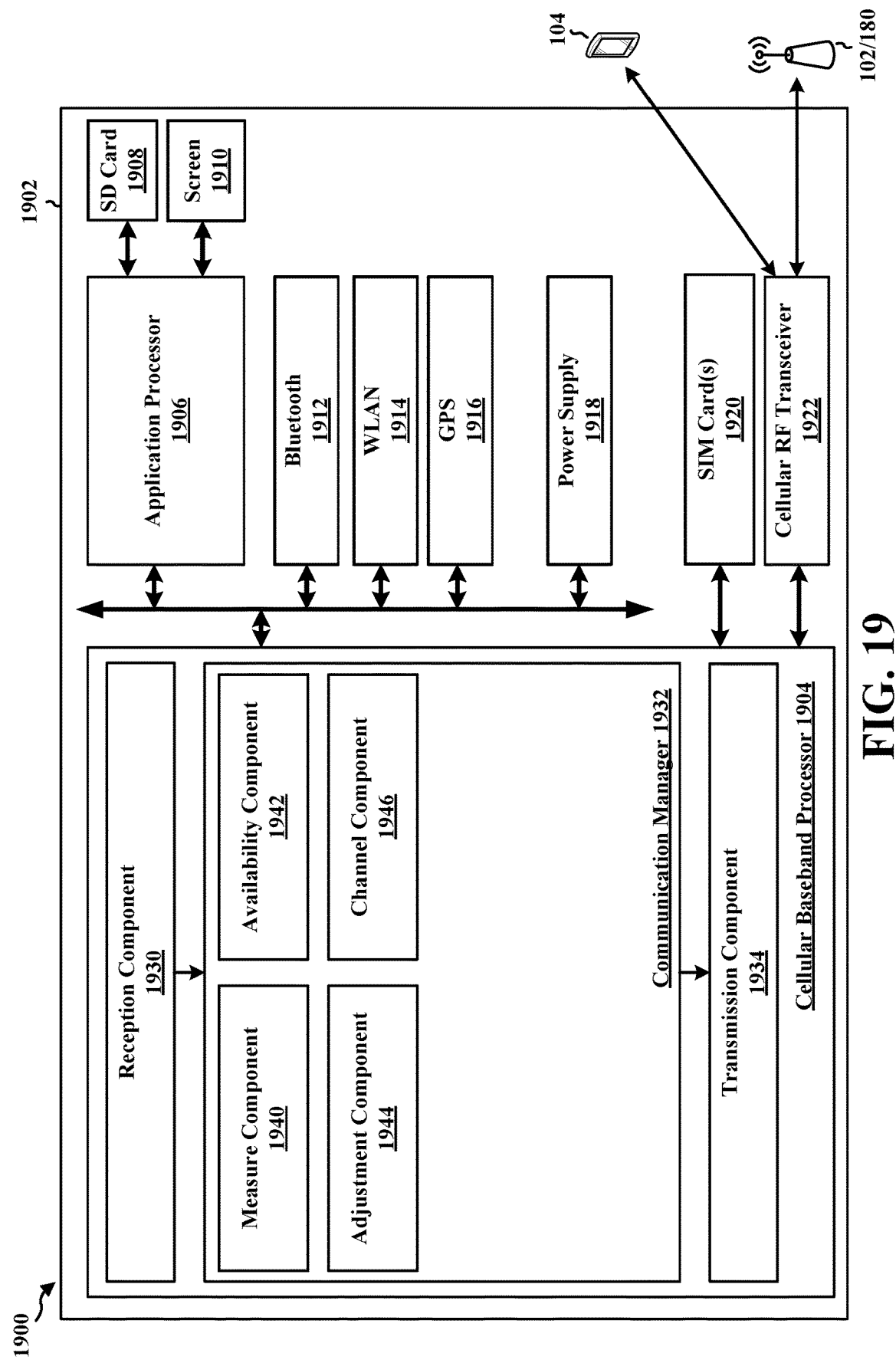
FIG. 19 is a diagram illustrating an example of a hardware implementation for an example apparatus.

FIG. 19 is a diagram 1900 illustrating an example of a hardware implementation for an apparatus 1902. In some aspects, the apparatus 1902 is a UE, while in some aspects the apparatus 1902 is a base station. The apparatus 1902 includes a cellular baseband processor 1904 (also referred to as a modem) coupled to a cellular RF transceiver 1922. In aspects where the apparatus 1902 is a UE, the apparatus 1902 may include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. In some aspects, the cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the aforediscussed additional modules of the apparatus 1902. In some aspects, the cellular baseband processor 1904 may be a component of the base station 310 and may include the memory 376 and/or at least one of the TX processor 316, the RX processor 370, and the controller/processor 375.

The communication manager 1932 includes a measure component 1940 that is configured to measure at least one energy sensing measurement of an operating channel, e.g., as described in connection with 1802 of FIG. 18. The communication manager 1932 further includes an availability component 1942 that is configured to determine whether the operating channel is available for transmission, e.g., as described in connection with 1804 of FIG. 18. The communication manager 1932 further includes an adjustment component 1944 that is configured to adjust the sensing threshold, e.g., as described in connection with 1806 of FIG. 18. The communication manager 1932 further includes a channel component 1946 that is configured to transmit on the operating channel, e.g., as described in connection with 1808 of FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for measuring at least one energy sensing measurement of an operating channel within a sensing bandwidth. The apparatus 1902 further includes means for determining whether the operating channel is available for transmission based on a sensing threshold for a transmission power level for a transmission bandwidth. The apparatus 1902 further includes means for adjusting the sensing threshold based on the sensing bandwidth and a bandwidth occupied by the transmission bandwidth. The apparatus 1902 further includes means for transmitting on the operating channel upon the determination that the operating channel is available for transmission for the transmission power level for the transmission bandwidth. The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: determine an energy detection threshold of a reference bandwidth, the energy detection threshold being based on at least one of a transmit power or a power class; measure an interference level of at least one signal; adjust the energy detection threshold of the reference bandwidth based on a sensing bandwidth; and determine whether a transmission medium is available based on at least one of the adjusted energy detection threshold or the measured interference level of the at least one signal.

Aspect 2 is the apparatus of aspect 1, where the at least one processor is further configured to: compare the adjusted energy detection threshold to the measured interference level of the at least one signal.

Aspect 3 is the apparatus of any of aspects 1 and 2, where the transmission medium is available when the measured interference level of the at least one signal is less than the adjusted energy detection threshold.

Aspect 4 is the apparatus of any of aspects 1 to 3, where the at least one processor is further configured to: transmit data via the transmission medium when the measured interference level of the at least one signal is less than the adjusted energy detection threshold.

Aspect 5 is the apparatus of any of aspects 1 to 4, where the at least one processor is further configured to: refrain from transmitting data via the transmission medium when the measured interference level of the at least one signal is greater than or equal to the adjusted energy detection threshold.

Aspect 6 is the apparatus of any of aspects 1 to 5, where the transmission medium corresponds to one or more transmission slots, and the measured interference level of the at least one signal corresponds to one or more contention slots.

Aspect 7 is the apparatus of any of aspects 1 to 6, where the energy detection threshold is increased when the sensing bandwidth increases.

Aspect 8 is the apparatus of any of aspects 1 to 7, where the energy detection threshold is decreased when the sensing bandwidth increases.

Aspect 9 is the apparatus of any of aspects 1 to 8, where the energy detection threshold corresponds to a non-increasing function with a minimum threshold.

Aspect 10 is the apparatus of any of aspects 1 to 9, where the energy detection threshold corresponds to a non-decreasing function with a maximum threshold.

Aspect 11 is the apparatus of any of aspects 1 to 10, where the energy detection threshold increases prior to a peak value, and the energy detection threshold decreases after the peak value.

Aspect 12 is the apparatus of any of aspects 1 to 11, where the energy detection threshold is adjusted based on at least one active bandwidth part (BWP) bandwidth associated with the reference bandwidth.

Aspect 13 is the apparatus of any of aspects 1 to 12, where the reference bandwidth is received from a base station.

Aspect 14 is the apparatus of any of aspects 1 to 13, where the reference bandwidth is obtained by the UE, and the adjusted energy detection threshold is received from a base station.

Aspect 15 is the apparatus of any of aspects 1 to 14, where the energy detection threshold is adjusted based on a union of one or more configured bandwidth part (BWP) bandwidths associated with the reference bandwidth.

Aspect 16 is the apparatus of any of aspects 1 to 15, where the energy detection threshold is adjusted based on at least one active bandwidth part (BWP) bandwidth associated with a network operating channel bandwidth.

Aspect 17 is the apparatus of any of aspects 1 to 16, where the network operating channel bandwidth is received from a base station.

Aspect 18 is the apparatus of any of aspects 1 to 17, where the network operating channel bandwidth is obtained by the UE, and the adjusted energy detection threshold is received from a base station.

Aspect 19 is the apparatus of any of aspects 1 to 18, further including a transceiver coupled to the at least one processor.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

Aspect 23 is an apparatus for wireless communication at a base station including at least one processor coupled to a memory and configured to: determine an energy detection threshold of a reference bandwidth, the energy detection threshold being based on at least one of a transmit power or a power class; measure an interference level of at least one signal; adjust the energy detection threshold of the reference bandwidth based on a sensing bandwidth; and determine whether a transmission medium is available based on at least one of the adjusted energy detection threshold or the measured interference level of the at least one signal.

Aspect 24 is the apparatus of aspect 23, where the at least one processor is further configured to: compare the adjusted energy detection threshold to the measured interference level of the at least one signal.

Aspect 25 is the apparatus of any of aspects 23 and 24, where the transmission medium is available when the measured interference level of the at least one signal is less than the adjusted energy detection threshold.

Aspect 26 is the apparatus of any of aspects 23 to 25, where the at least one processor is further configured to: transmit data via the transmission medium when the measured interference level of the at least one signal is less than the adjusted energy detection threshold.

Aspect 27 is the apparatus of any of aspects 23 to 26, where the at least one processor is further configured to: refrain from transmitting data via the transmission medium when the measured interference level of the at least one signal is greater than or equal to the adjusted energy detection threshold.

Aspect 28 is the apparatus of any of aspects 23 to 27, where the transmission medium corresponds to one or more transmission slots, and the measured interference level of the at least one signal corresponds to one or more contention slots.

Aspect 29 is the apparatus of any of aspects 23 to 28, where the energy detection threshold is increased when the sensing bandwidth increases.

Aspect 30 is the apparatus of any of aspects 23 to 29, where the energy detection threshold is decreased when the sensing bandwidth increases.

Aspect 31 is the apparatus of any of aspects 23 to 30, where the energy detection threshold corresponds to a non-increasing function with a minimum threshold.

Aspect 32 is the apparatus of any of aspects 23 to 31, where the energy detection threshold corresponds to a non-decreasing function with a maximum threshold.

Aspect 33 is the apparatus of any of aspects 23 to 32, where the energy detection threshold increases prior to a peak value, and the energy detection threshold decreases after the peak value.

Aspect 34 is the apparatus of any of aspects 23 to 33, where the energy detection threshold is adjusted based on at least one active bandwidth part (BWP) bandwidth associated with the reference bandwidth.

Aspect 35 is the apparatus of any of aspects 23 to 34, where the reference bandwidth is obtained by the base station.

Aspect 36 is the apparatus of any of aspects 23 to 35, where the reference bandwidth is received from a UE, and the adjusted energy detection threshold is obtained by the base station.

Aspect 37 is the apparatus of any of aspects 23 to 36, where the energy detection threshold is adjusted based on a union of one or more configured bandwidth part (BWP) bandwidths associated with the reference bandwidth.

Aspect 38 is the apparatus of any of aspects 23 to 37, where the energy detection threshold is adjusted based on at least one active bandwidth part (BWP) bandwidth associated with a network operating channel bandwidth.

Aspect 39 is the apparatus of any of aspects 23 to 38, where the network operating channel bandwidth is obtained by the base station.

Aspect 40 is the apparatus of any of aspects 23 to 39, where the network operating channel bandwidth is received from a UE, and the adjusted energy detection threshold is obtained by the base station.

Aspect 41 is the apparatus of any of aspects 23 to 40, further including a transceiver coupled to the at least one processor.

Aspect 42 is a method of wireless communication for implementing any of aspects 23 to 41.

Aspect 43 is an apparatus for wireless communication including means for implementing any of aspects 23 to 41.

Aspect 44 is a computer-readable medium storing computer executable code, where the code when executed by a processor causes the processor to implement any of aspects 23 to 41.

Aspect 45 is an apparatus for wireless communication at a wireless device including at least one processor coupled to a memory and configured to: measure at least one energy sensing measurement of an operating channel within a sensing bandwidth; determine whether the operating channel is available for transmission based on a sensing threshold for a transmission power level for a transmission bandwidth; adjust the sensing threshold based on the sensing bandwidth and a bandwidth occupied by the transmission bandwidth; and transmit on the operating channel upon the determination that the operating channel is available for transmission for the transmission power level for the transmission bandwidth.

Aspect 46 is the apparatus of aspect 45, where the transmission bandwidth is different from the sensing bandwidth.

Aspect 47 is the apparatus of any of aspects 45 and 46, where the sensing threshold is adjusted to match the sensing bandwidth with the bandwidth occupied by the transmission bandwidth.

Aspect 48 is the apparatus of any of aspects 45 to 47, where the bandwidth occupied by the transmission bandwidth includes part of the sensing bandwidth.

Aspect 49 is the apparatus of any of aspects 45 to 48, where the sensing threshold is adjusted based on the bandwidth occupied by the transmission bandwidth and the sensing bandwidth.

Aspect 50 is the apparatus of any of aspects 45 to 49, where the bandwidth occupied by the transmission bandwidth is contiguous or localized.

Aspect 51 is the apparatus of any of aspects 45 to 50, where the bandwidth occupied by the transmission bandwidth includes a bandwidth span that is substantially similar to the sensing bandwidth.

Aspect 52 is the apparatus of any of aspects 45 to 51, where the sensing threshold is adjusted based on the bandwidth span occupied by the transmission bandwidth and the sensing bandwidth.

Aspect 53 is the apparatus of any of aspects 45 to 52, where the bandwidth span occupied by the transmission bandwidth is discontiguous, non-localized, or includes frequency hopping.

Aspect 54 is the apparatus of any of aspects 45 to 53, where the wireless device includes a user equipment (UE).

Aspect 55 is the apparatus of any of aspects 45 to 54, where the wireless device includes a base station.

Aspect 56 is the apparatus of any of aspects 45 to 55, further including a transceiver coupled to the at least one processor.

Aspect 57 is a method of wireless communication for implementing any of aspects 45 to 56.

Aspect 58 is an apparatus for wireless communication including means for implementing any of aspects 45 to 56.

Aspect 59 is a computer-readable medium storing computer executable code, where the code when executed by a processor causes the processor to implement any of aspects 45 to 56.

What is claimed is:

1. A method of wireless communication at a user equipment (UE), comprising:
    determining an energy detection threshold of a reference bandwidth, the energy detection threshold being based on at least one of a transmit power or a power class;
    measuring an interference level of at least one signal;
    adjusting the energy detection threshold of the reference bandwidth based on a sensing bandwidth; and
    determining whether a transmission medium is available based on at least one of the adjusted energy detection threshold or the measured interference level of the at least one signal,
    wherein the energy detection threshold increases prior to a peak value, and the energy detection threshold decreases after the peak value, wherein the energy detection threshold is adjusted based on a union of one or more configured bandwidth part (BWP) bandwidths associated with the reference bandwidth.

2. The method of claim 1, further comprising:
    comparing the adjusted energy detection threshold to the measured interference level of the at least one signal.

3. The method of claim 2, wherein the transmission medium is available when the measured interference level of the at least one signal is less than the adjusted energy detection threshold.

4. The method of claim 1, further comprising:
    transmitting data via the transmission medium when the measured interference level of the at least one signal is less than the adjusted energy detection threshold.

5. The method of claim 1, further comprising:
    refraining from transmitting data via the transmission medium when the measured interference level of the at least one signal is greater than or equal to the adjusted energy detection threshold.

6. The method of claim 1, wherein the transmission medium corresponds to one or more transmission slots, and the measured interference level of the at least one signal corresponds to one or more contention slots.

7. The method of claim 1, wherein the energy detection threshold is increased when the sensing bandwidth increases; or
    wherein the energy detection threshold is decreased when the sensing bandwidth increases.

8. The method of claim 1, wherein the energy detection threshold corresponds to a non-increasing function with a minimum threshold; or
    wherein the energy detection threshold corresponds to a non-decreasing function with a maximum threshold.

9. The method of claim 1, wherein the energy detection threshold is adjusted based on at least one active bandwidth part (BWP) bandwidth associated with the reference bandwidth, wherein the reference bandwidth is received from a base station, wherein the reference bandwidth is obtained by the UE, and the adjusted energy detection threshold is received from a base station.

10. The method of claim 1, wherein the energy detection threshold is adjusted based on at least one active bandwidth part (BWP) bandwidth associated with a network operating channel bandwidth, wherein the network operating channel bandwidth is received from a base station, wherein the network operating channel bandwidth is obtained by the UE, and the adjusted energy detection threshold is received from a base station.

11. An apparatus for wireless communication at a user equipment (UE), comprising:
    a memory; and
    at least one processor coupled to the memory and configured to:
        determine an energy detection threshold of a reference bandwidth, the energy detection threshold being based on at least one of a transmit power or a power class;
        measure an interference level of at least one signal;
        adjust the energy detection threshold of the reference bandwidth based on a sensing bandwidth; and
        determine whether a transmission medium is available based on at least one of the adjusted energy detection threshold or the measured interference level of the at least one signal,
    wherein the energy detection threshold increases prior to a peak value, and the enemy detection threshold decreases after the peak value, wherein the energy detection threshold is adjusted based on a union of one or more configured bandwidth part (BIWA) bandwidths associated with the reference bandwidth.

12. The apparatus of claim 11, wherein the at, least, one processor is further configured to:

compare the adjusted energy detection threshold to the measured interference level of the at least one signal.

13. The apparatus of claim 12, wherein the transmission medium is available when the measured interference level of the at least one signal is less than the adjusted energy detection threshold.

14. The apparatus of claim 11, wherein the at least one processor is further configured to:
transmit data via the transmission medium when the measured interference level of the at least one signal is less than the adjusted energy detection threshold, further comprising a transceiver coupled to the at least one processor.

15. The apparatus of claim 11, wherein the at least one processor is further configured to:
refrain from transmitting data via the transmission medium when the measured interference level of the at least one signal is greater than or equal to the adjusted energy detection threshold.

16. The apparatus of claim 11, wherein the transmission medium corresponds to one or more transmission slots, and the measured interference level of the at least one signal corresponds to one or more contention slots.

17. The apparatus of claim 11, wherein the energy detection threshold is increased when the sensing bandwidth increases; or
wherein the energy detection threshold is decreased when the sensing bandwidth increases.

18. The apparatus of claim 11, wherein the energy detection threshold corresponds to a non-increasing function with a minimum threshold; or
wherein the energy detection threshold corresponds to a non-decreasing function with a maximum threshold.

19. The apparatus of claim 11, wherein the energy detection threshold is adjusted based on at least, one active bandwidth part (BWP) bandwidth associated with the reference bandwidth, wherein the reference bandwidth is received from a base station, wherein the reference bandwidth is obtained by the UE, and the adjusted energy detection threshold is received from a base station.

20. The apparatus of claim 11, wherein the energy detection threshold is adjusted based on at least one active bandwidth part (BWP) bandwidth associated with a network operating channel bandwidth, wherein the network operating channel bandwidth is received from a base station, wherein the network operating channel bandwidth is obtained by the UE, and the adjusted energy detection threshold is received from a base station.

21. A method of wireless communication at a base station, comprising:
determining an energy detection threshold of a reference bandwidth, the energy detection threshold being based on at least one of a transmit power or a power class;
measuring an interference level of at least one signal;
adjusting the energy detection threshold of the reference bandwidth based on a sensing bandwidth; and
determining whether a transmission medium is available based on at least one of the adjusted energy detection threshold or the measured interference level of the at least one signal,
wherein the energy detection threshold increases prior to a peak value, and the energy detection threshold decreases after the peak value, wherein the energy detection threshold is adjusted based on a union of one or more configured bandwidth part (BWP) bandwidths associated with the reference bandwidth.

22. The method of claim 21, further comprising:
comparing the adjusted energy detection threshold to the measured interference level of the at least one signal.

23. The method of claim 21, further comprising:
transmitting data via the transmission medium when the measured interference level of the at least one signal is less than the adjusted energy detection threshold.

24. The method of claim 21, further comprising:
refraining from transmitting data via the transmission medium when the measured interference level of the at least one signal is greater than or equal to the adjusted energy detection threshold.

25. An apparatus for wireless communication at a base station, comprising:
a memory; and
at least one processor coupled to the memory and configured to:
determine an energy detection threshold of a reference bandwidth, the energy detection threshold being based on at least one of a transmit power or a power class;
measure an interference level of at least one signal;
adjust the energy detection threshold of the reference bandwidth based on a sensing bandwidth; and
determine whether a transmission medium is available based on at least one of the adjusted energy detection threshold or the measured interference level of the at least one signal,
wherein the energy detection threshold increases prior to a peak value, and the energy detection threshold decreases after the peak value, wherein the energy detection threshold is adjusted based on a union of one or more configured bandwidth part (BWP) bandwidths associated with the reference bandwidth.

26. The apparatus of claim 25, wherein the at least one processor is further configured to:
compare the adjusted energy detection threshold to the measured interference level of the at least one signal.

27. The apparatus of claim 25, wherein the at least one processor is further configured to:
transmit data via the transmission medium when the measured interference level of the at least one signal is less than the adjusted energy detection threshold, further comprising a transceiver coupled to the at least one processor.

28. The apparatus of claim 25, wherein the at least one processor is further configured to:
refrain from transmitting data via the transmission medium when the measured interference level of the at least one signal is greater than or equal to the adjusted energy detection threshold.

* * * * *